United States Patent
Jang et al.

(10) Patent No.: US 12,443,803 B2
(45) Date of Patent: Oct. 14, 2025

(54) SYSTEMS AND METHODS FOR TARGETED INTERACTIONS WITH COMPUTATIONAL MODELS

(71) Applicant: OpenAI Opco, LLC, San Francisco, CA (US)

(72) Inventors: Jungwon Jang, San Francisco, CA (US); Warren Ouyang, Sunnyvale, CA (US); Ian Silber, New York City, NY (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/931,573

(22) Filed: Oct. 30, 2024

(65) Prior Publication Data
US 2025/0139387 A1     May 1, 2025

Related U.S. Application Data

(60) Provisional application No. 63/594,381, filed on Oct. 30, 2023.

(51) Int. Cl.
*G06F 40/40*     (2020.01)
*G06F 3/0484*    (2022.01)
(Continued)

(52) U.S. Cl.
CPC ............ *G06F 40/40* (2020.01); *G06F 40/284* (2020.01); *G06F 40/289* (2020.01); *G06F 3/0484* (2013.01)

(58) Field of Classification Search
CPC ...... G06F 40/40; G06F 40/284; G06F 40/289; G06F 3/0484
(Continued)

(56) References Cited

U.S. PATENT DOCUMENTS

2024/0338860 A1 * 10/2024 Trzyna .................. G06F 40/44

OTHER PUBLICATIONS

Perez, F. et al., "Ignore Previous Prompt: Attack Techniques For Language Models", ML Safety Workshop, 36th Conference on Neural Information Processing Systems (arXiv:2211.09527v1 [cs. CL] Nov. 17, 2022), 21 pages.
(Continued)

*Primary Examiner* — Thierry L Pham
(74) *Attorney, Agent, or Firm* — Finnegan, Henderson, Farabow, Garrett & Dunner, LLP

(57) ABSTRACT

Accurate prompting improves the operation, efficiency, and output of computer models, such as language models. The disclosed systems and methods improve interaction with computer models by facilitating the generation of accurate prompts for targeted interactions with computer models. For example, disclosed systems can be configured to store prompts and responses generated with computer models in session memories. The system can use information in session memories to generate combined prompts when receiving prompts that refer to previous prompts or answers. The system improves prompt accuracy by generating combined prompts—formed by combining the context from the stored information (e.g., in context sub-prompts) and instructions in the new prompt (e.g., in instructions sub-prompts). The system can generate responses based on the combined prompts allowing the computer models to leverage the context in previous interactions, without burdensome or complicated prompts, for more meaningful or accurate responses.

19 Claims, 20 Drawing Sheets

(51) Int. Cl.
    *G06F 40/284* (2020.01)
    *G06F 40/289* (2020.01)
(58) Field of Classification Search
    USPC .............................................................. 704/9
    See application file for complete search history.

(56) References Cited

OTHER PUBLICATIONS

Zhao, J. et al., "Targeted Feedback Generation for Constructed-Response Questions", Association for the Advancement of Artificial Intelligence (www.aaai.org), AAAI 2021 Workshop on AI Education, 9 pages.

Krasheninnikov, D. et al., "Assistance with large language models", ML Safety workshop at NeurIPS 2022, 9 pages.

Perez, E., et al., "Red Teaming Language Models with Language Models", Proceedings of the 2022 Conference on Empirical Methods in Natural Language Processing, pp. 3419-3448.

Choi, E. et al., "Prompt Injection: Parameterization of Fixed Inputs", arXiv:2206.11349v2 [cs.LG] Jul. 15, 2022, preprint, 12 pages.

Arora, S. et al., "Ask Me Anything: A Simple Strategy for Prompting Language Models", arXiv:2210.02441v3 [cs.CL] Nov. 20, 2022, 63 pages.

* cited by examiner

FIG. 8

User: i don't want bullet points — 802

Model:

In October 2022, Ms. Rani returned to Yuba Sutter Chiropractic on October 4 for treatment of injuries from a July 20 crash. She reported bilateral thoracic and lumbar pain and received chiropractic adjustments, EMS, mechanical traction, and manual therapy. The treatment plan included twice weekly visits for a month with a focus on reducing pain, improving core strength and stability, and increasing range of motion.

During November 2022, Ms. Rani had multiple appointments at Yuba Sutter Chiropractic. On November 3, she received spinal adjustments, mechanical traction, and EMS for crash-related bilateral thoracic and lumbar pain. On November 9, she reported exacerbated pain from bending, lifting, and twisting and received spinal adjustments with a new care plan of once-weekly visits for two months. On November 17, Ms. Rani saw Dr. Gurjinder Kalay for intermittent aching pain and received similar treatments as previous visits, with weekly sessions planned for two months. On November 22, she sought care for thoracic and lumbar pain and received chiropractic adjustments, EMS, mechanical traction, and manual therapy techniques, continuing her treatment and home care. On November 29, Mr. Rani visited the clinic for bilateral pain treatment, receiving chiropractic adjustments, EMS, and mechanical traction, with a prescribed home exercise program for two months.

In December 2022, Mr. Rani visited Yuba Sutter Chiropractic twice. On December 2, she was diagnosed with Radiculopathy in the lumbosacral region, and sprains of the sacroiliac joint, lumbar spine, and thoracic spine. She received various chiropractic treatments and was advised to continue with weekly relief/acute care for two months. On December 6, Ms. Rani presented for the treatment of bilateral thoracic and lumbar stiffness. She received chiropractic adjustments, EMS, mechanical traction, and manual therapy techniques, with planned weekly visits for two months focusing on inflammation reduction, core strength improvement, and daily activity tolerance increase.

User: you can be more general on [the second paragraph] — 808

302 — user
1002 — finish
1004 — While starting at 9am may serve a valuable purpose for who...commencing work at early hours brings a multitude of advantages. Based on aforementioned reasoning, it is clearly more feasible due to the benefits it offers to work-life balance and productivity.

1026

306 — Model
1006 — Certainly, here's the completed sentence with the suggested rephrase:

"While starting at 9 am may serve a valuable purpose for those who struggle with schedule adjustments, commencing work at early hours brings a multitude of advantages. Based on the reasoning mentioned above, it is clearly more feasible due to the benefits it offers to work-life balance and productivity."

1008
1010

304 — user
1012 — in that case, I wrote "it is clearly more feasible". is it appropriate?

1014 — Alternative / Model A
1016 — Convo Classifier
TOPIC: INFO
INTERACTION_QUALITY: GOOD
CHAT: TINKERING
INFO: ANSWERS
TASK: KNOWLEDGE 1018 — The phrase "it is clearly more feasible" is appropriate and conveys the idea that the option of commencing work at early hours is a more practical or workable choice. However, if you want to emphasize the advantages and make it sound even more compelling, you might consider a phrase like "it is undeniably a superior option" or "it is undoubtedly a better choice." These alternatives would strengthen the language to further support your viewpoint.

1020
1022 — Alternative / Model B

In your context, "more feasible" implies that starting work at early hours is a more practical or viable option compared to the alternative. If that's the intended meaning, then "more feasible" is appropriate. However, if you're trying to emphasize the superiority of starting early hours, you might consider using "more advantageous" or "more beneficial" to highlight the positive aspects of the decision.

For instance: "Based on the reasoning mentioned above, it is clearly more beneficial due to the advantages it offers for work-life balance and productivity."

This phrasing emphasizes the positive outcomes of starting work at early hours. Choose the term that best aligns with the specific point you want to convey.

SYSTEMS AND METHODS FOR TARGETED INTERACTIONS WITH COMPUTATIONAL MODELS

This application claims priority to U.S. Provisional Patent Application No. 63/594,381, filed Oct. 30, 2023, the entire contents of which is hereby incorporated by reference in its entirety.

FIELD OF DISCLOSURE

The disclosure generally relates to systems, devices, apparatuses, and methods for improved prompting and targeted interactions with computer models, especially with language models (LMs). In particular, and without limitation, the disclosure relates to systems that permit or facilitate the generation of targeted prompts that combine information from multiple sources (e.g., previous interactions and/or session, client, or permanent memories) for generating more accurate and efficient computer model responses. The disclosure also relates to interfaces that permit targeted interactions with computer models and facilitate efficient and targeted prompting for computer models to reduce the number of prompts and improve token efficiency.

BACKGROUND

Computer models are digital representations of processes or systems designed to simulate, analyze, or predict behavior across various domains. These models range from simple mathematical equations to complex simulations. They can be categorized into several types, including statistical models, physical simulations, and machine learning models. Among the latter, language models (LMs) have emerged as a powerful subset.

LMs are machine learning (ML) or artificial intelligence (AI) models that use deep learning algorithms to process and understand natural language and are designed to generate content. LMs are trained on large datasets and configured to understand patterns and relationships in natural language. LMs can perform many types of language tasks, such as translating languages, analyzing sentiments, automated conversations, and more. LMs can understand complex textual data, identify entities and relationships between them, and generate new text that is coherent and grammatically accurate. LMs can solve complex tasks and can be tailored to perform complex operations like reasoning, answering, and context determination. To interact with LMs users normally prompt the model with requests, questions, or instructions for a model-generated response. For example, LMs may receive a query or prompt by a user, the LM may process the query or prompt using algorithms (e.g., deep neural networks), and then generate and output a response. Using prompts (and more often a sequence of prompts) may allow LMs to solve tasks.

LMs, however, are usually trained with general datasets and their responses can be generic. Prompting techniques may allow to tailor the responses of LMs to enhance the capabilities of LMs and facilitate obtaining specific responses or having the LM perform specific and complex tasks. But accurate prompting of LMs can be challenging. The technical field of prompt engineering seeks to optimize interactions with LMs using more accurate prompts. Prompt engineering uses a systematic design and refinement of input prompts to elicit desired outputs or behaviors from LMs. However, interacting with LMs via prompt engineering can be difficult, require specialized knowledge, or require multiple prompts and a sequence of computer operations that can be time consuming, computationally expensive, and inaccessible to average users. For example, to have an LM respond to a specific query it may be necessary to use multiple prompts to tailor a response in different iterations. Using multiple prompts may be not only time consuming, but also computationally expensive as resolving each prompt may require the processing of independent prompts.

The disclosed systems, apparatuses, devices, and methods are directed to overcoming these and other drawbacks of existing systems and for improved systems and methods for image generation with machine learning and/or AI models.

SUMMARY

Embodiments of the present disclosure present technical improvements and solutions to technical problems in conventional systems. For example, the disclosed systems and methods are directed to improving prompting and interaction with computer models like LMs. In particular, but without limitation, the disclosed systems and methods are directed to computer, web-based tools, and interfaces that permit faster and simpler targeted interactions with LMs by generating and providing targeted inputs and/or prompts to computer models. The targeted prompts can be formed with a combination of user instructions and context (e.g., a previous model response and/or a previous prompt) to seek more accurate responses. Disclosed systems and methods may facilitate generation of targeted prompts in the context of specific interactions with LMs while minimizing the number of prompts required for generating a desired output that is tailored to user requests. These systems thus improve the operation of the computer models by permitting fast and user-friendly targeted prompting.

The disclosed systems can in particular (but without limitation) improve the technical field of LM prompting by providing tools, systems, and methods that facilitate the generation of precise prompts by leveraging context and session interactions to reduce ambiguity and minimize irrelevant or tangential responses. More precise LM prompting improve the model response because outputs from the model can be more accurate and tailored to user requests, without the user having to input detailed or cumbersome prompts. The disclosed systems improve the technical field because they permit automatically crafting prompts with a combination of information that overcome technical issues such as response biases, response hallucination, or overly generic answers that would require additional prompts. By minimizing the requirement of follow-up user prompts, the disclosed systems reduce the overall computational expense, in terms of reducing resources devoted for inference operations and for query transmission and improving token efficiency.

Some aspects of the present disclosure may be directed to systems for targeted interactions with a computer model. The systems may include computing components like a memory structure that stores instructions and processors configured to execute the instructions and perform operations (e.g., the system may be hosted in a web server with memory and processors). The system can perform operations for targeted responses such as receiving a first prompt through an interface, storing the first prompt in a session memory, and outputting a first response to the first prompt using the computer model—the session memory may be temporary storage associated with a session (e.g., with a conversation with a user). The system can also perform operations like receiving a second prompt through the interface with the second prompt including a reference to a segment of the first response and a user instruction. And the system may be configured to perform operations to, in response to receiving the second prompt, generate a combined prompt that would result in a more accurate tailored response. In generating the combined prompt, the system can perform operations of retrieving a segment response from the session memory and generating a context sub-prompt with the segment, generating an instruction sub-prompt including the user instruction (or a portion of it), and combining the context sub-prompt with the instruction sub-prompt in the combined prompt. The system may also be configured to perform operations for outputting a second response to the combined prompt using the computer model and responding to the second prompt. This combination of features and operations may allow a user to perform targeted interactions with a computer model (like an LM) with a seamless interface that makes the model responses more efficient.

Another aspect of the present disclosure is directed to a method for targeted interactions with an LM. The method may include steps of:

receiving a user prompt through an interface, with the user prompt including a reference to a past response generated by the LM within a session and a user instruction;

in response and/or after receiving the user prompt with the reference to a past response, the method may include operations of:

identifying in a session memory a past prompt associated with the past response by comparing the reference with prompts stored in the session memory, retrieving at least a segment of the past prompt from the session memory, generating a context sub-prompt with the segment, generating an instruction sub-prompt with the user instruction, generating a combined prompt combining the context sub-prompt and the instruction sub-prompt;

generating a new response to the combined prompt using the language model; and outputting the new response via the interface as responding to the user prompt.

Yet another aspect of this disclosure is directed to a cloud server hosted on a network. The cloud server can include components like a memory device, a database connected to the network servers, and a processor. The processor can be configured to perform operations for generating targeted replies with a computer model, the operations can include displaying a graphical user interface (GUI) associated with a computer model on a client device, receiving a first prompt via the GUI, and outputting a first response to the first prompt via the GUI. The operations can also include receiving a user selection of an element in the first response displayed in the GUI, receiving a second user prompt via the GUI, and generating a combined prompt by combining the user selection and the second user prompt. The operations can also include providing the combined prompt to the computer model in tokens and outputting the computer model response to the combined prompt via the GUI.

Some aspects of the present disclosure may also be directed to tools for capturing user input and generate customized, combined, or detailed prompts for computer model interaction. For example, user selections may include emphasizing with a cursor a portion of the graphical user interface to highlight a segment of a previous response. Additionally, systems and methods may be configured to generate responses in graphical user interfaces that allow users to emphasize a portion of the new response based on the user selection (e.g., to highlight where the targeted response made changes). In such embodiments, the element displayed in the graphical user interface is content generated by the machine learning model and the content generated by the machine learning model includes an answer to a previous prompt by a user.

Other systems, methods, and computer-readable media are also discussed within. The foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 8 is a fifth example of a graphical user interface describing interactions with a computer model according to various aspects of the present disclosure.

FIG. 10 is a seventh example of a graphical user interface describing interactions with a computer model according to various aspects of the present disclosure.

DETAILED DESCRIPTION

Figure 1:
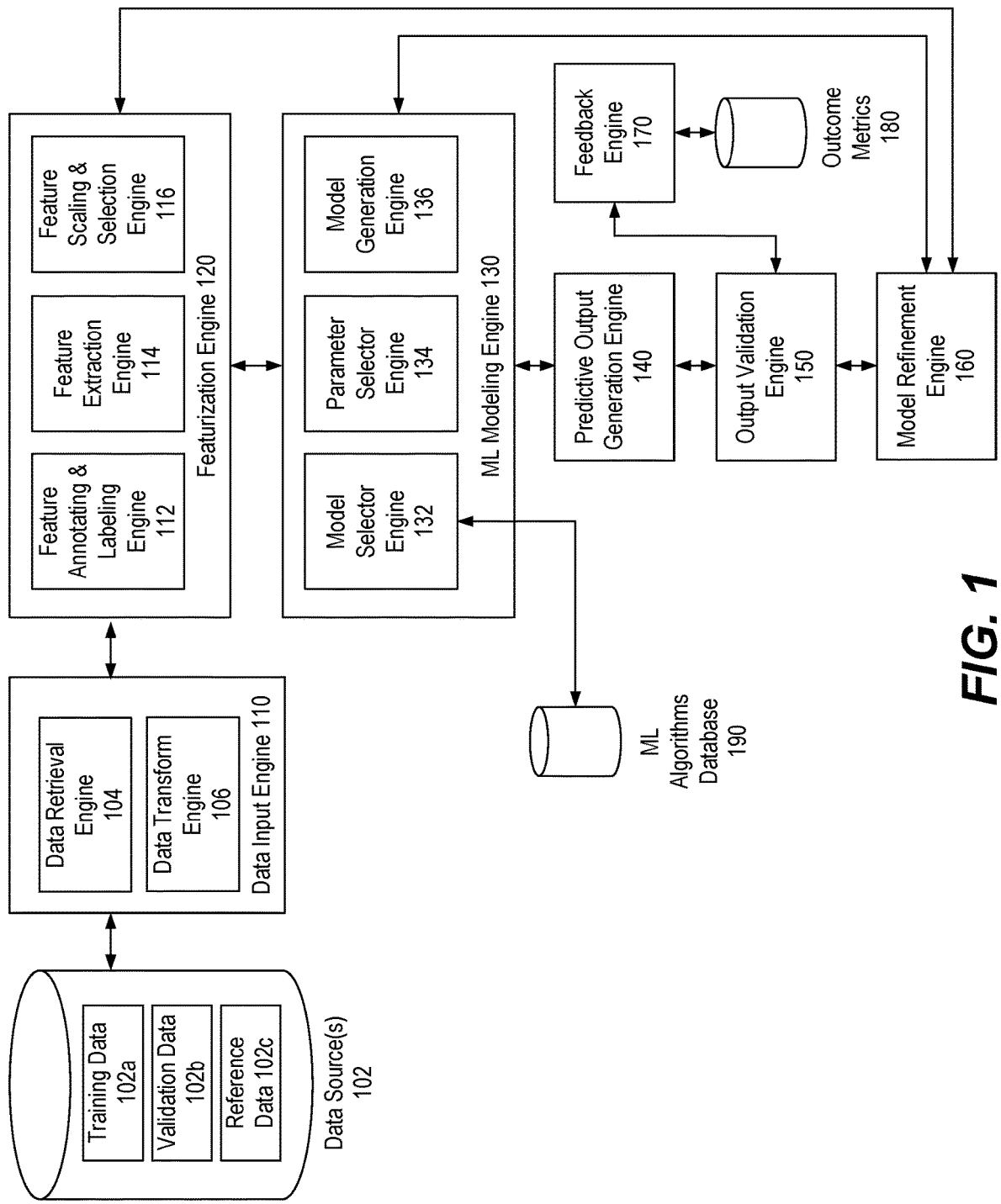
FIG. 1 is a block diagram illustrating an example of a machine learning platform for implementing various aspects of this disclosure.

Some of the disclosed embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example systems or methods. However, it will be understood by those skilled in the art that the principles of the example methods and systems may be practiced without every specific detail. Well-known methods, procedures, and components have not been described in detail so as not to obscure the principles of some of the disclosed methods and systems. Unless explicitly stated, the example methods and processes described herein are neither constrained to a particular order or sequence nor constrained to a particular system configuration. Additionally, some of the described methods and systems or elements thereof can occur or be performed (e.g., executed) simultaneously, at the same point in time, or concurrently. Reference will now be made in detail to some of the disclosed methods and systems, examples of which are illustrated in the accompanying drawings.

It is to be understood that both the foregoing general description and the following detailed description are example and explanatory only and are not restrictive of this disclosure. The accompanying drawings, which are incorporated in and constitute a part of this specification, illustrate several disclosed methods and systems and together with the description, serve to outline principles of some of the disclosed methods and systems.

The systems and methods described below improve computer model efficiency with a system and/or infrastructure that allows users to more quickly and efficiently interact with computer models using simpler and faster inputs. For example, the disclosed systems and methods may permit generation of prompts to computer models with tools that are simpler to use and improve computer resource usage. The disclosed systems may permit faster and more detailed prompting while minimizing the time and resources to solve a prompt with tools that result in more efficient prompts. Efficient prompting plays an important role in reducing the number of tokens processed by computer models, both by minimizing follow-up prompts and by crafting prompts that minimize extraneous information. The disclosed systems improve the technical field with tools for faster and more efficient prompting.

The systems and methods described below can also improve the field of LM or computer model operation by automatically generating concise, well-structured prompts that (with simple user input) consider multiple variables and more precisely communicate a user desired task seeking a tailored response. For example, the disclosed systems can assess the relevant context from user requests (e.g., querying a session memory) and generate prompts that minimize unnecessary information and remove extraneous details while providing the key context that is useful for a targeted reply. The disclosed systems and methods provide a streamlined approach for targeted prompting that not only leads to more focused and relevant responses but also decreases the computational resources required for each interaction. Computer models, in particular LMs, process information on a token-by-token basis. The disclosed systems make interactions more efficient by reducing the input length, resulting in fewer tokens being analyzed and generated. This optimization can be particularly valuable in scenarios with high-volume usage or resource constraints, as it can lead to faster response times, lower operational costs, and improved overall system performance. The disclosed systems thus improve the technical field of LM model operation and prompting by providing tools for efficient prompting that enable users to extract maximum value from LMs responses while minimizing the associated computational overhead.

Further, the computer methods and architectures described below can also improve the efficiency of systems supporting LMs or other computer systems by providing distributed network architecture configured to reduce network congestion while generating crafting prompts for more targeted interactions. For example, as further discussed below, disclosed systems may include distributed request handlers, prompt configuration engines, and/or networked services to perform different tasks when resolving a query from a user. Disclosed systems may facilitate the generation of targeted prompts and the distribution of information within elements of a system to generate a targeted response. Additionally, the disclosed systems can enable the digital environments in which one principal computer system generates a request that is processed by a different system agent system, in a computer using agent system. For example, the disclosed architectures permit the configuration of computer systems that interact with each other, in principal-agent relationships under a computer using agent system where one autonomous or semi-autonomous client system generates queries or prompts that are solved by other autonomous or semi-autonomous agent system with different resources and/or configuration. Such configurations enabled by the architecture and capabilities of the disclosed systems improve interactions with computer models by, for example, allowing users without prompting experience to leverage other computer tools easily and effectively interact with computer models.

The disclosed systems may also improve the technical field of LM operation by providing specific interface features allowing users to more quickly identify previous responses, request specific changes, or provide specific feedback to be incorporated in a prompt for a targeted reply. For example, some of the disclosed systems can generate graphical user interfaces that allow users to easily interact with previous model responses to request specific modification, additions, or deletions, with simple and intuitive user interactions. Further, the disclosed systems may facilitate adoption of LMs with interfaces that are simple to navigate and use intuitive selection and prompting to request targeted replies or responses. The disclosed systems thus solve technical problems of providing interfaces that assists users in interacting with LMs more quickly and with less prompts. For example, the disclosed systems can provide new technical functionality by facilitating completion of tasks with less prompts, identify useful information faster, create a usage feedback that makes LMs models more accurate, smarter, and easier to interact with. Further, the disclosed systems and methods may facilitate fine-tuning models at scale by capturing more and clearer user feedback on model responses.

FIG. 1 is a block diagram illustrating an example machine learning system 100 for implementing various aspects of this disclosure.

System 100 may include data input engine 110 that can further include data retrieval engine 104 and data transform engine 106. Data retrieval engine 104 may be configured to access, interpret, request, or receive data, which may be adjusted, reformatted, or changed (e.g., to be interpretable by other engines, such as data input engine 110). For example, data retrieval engine 104 may request data from a remote source using an API. Data input engine 110 may be configured to access, interpret, request, format, re-format, or receive input data from data source(s) 102. For example, data input engine 110 may be configured to use data transform engine 106 to execute a re-configuration or other change to data, such as a data dimension reduction. Data source(s) 102 may exist at memories and/or data storages. In some of the disclosed methods and systems, data source(s) 102 may be associated with a single entity (e.g., organization) or with multiple entities. Data source(s) 102 may include training data 102a (e.g., input data to feed a machine learning model as part of one or more training processes), validation data 102b (e.g., data against which at least one processor may compare model output with, such as to determine model output quality), and/or reference data 102c. In some of the disclosed methods and systems, data input engine 110 can be implemented using at least one computing device (e.g., computing device 2002 in FIG. 20). For example, data from data sources 102 can be obtained through one or more I/O devices and/or network interfaces. Further, the data may be stored (e.g., during execution of one or more operations) in a suitable storage or system memory. Data input engine 110 may also be configured to interact with a data storage (e.g., data storage 2008 in FIG. 20), which may be implemented on a computing device that stores data in storage or system memory.

System 100 may include featurization engine 120. Featurization engine 120 may include feature annotating & labeling engine 112 (e.g., configured to annotate or label features from a model or data, which may be extracted by feature extraction engine 114), feature extraction engine 114 (e.g., configured to extract one or more features from a model or data), and/or feature scaling and selection engine 116. Feature scaling and selection engine 116 may be configured to determine, select, limit, constrain, concatenate, or define features (e.g., AI features) for use with AI models. Similar to data input engine 110, featurization engine 120 may be implemented on a computing device. Further, featurization engine 120 may utilize storage or system memory for storing data and may utilize one or more I/O devices or network interfaces for sending or receiving data.

System 100 may also include machine learning (ML) modeling engine 130, which may be configured to execute one or more operations on a machine learning model (e.g., model training, model re-configuration, model validation, model testing), such as those described in the processes described herein. For example, ML modeling engine 130 may execute an operation to train a machine learning model, such as adding, removing, or modifying a model parameter. Training of a machine learning model may be supervised, semi-supervised, or unsupervised. In some of the disclosed methods and systems, training of a machine learning model may include multiple epochs, or passes over a dataset (e.g., training data 102a). In some of the disclosed methods and systems, different epochs may have different degrees of supervision (e.g., supervised, semi-supervised, or unsupervised).

Data inputted into a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed methods and systems in any way, a machine learning model may include millions, trillions, billings, or even trillions of model parameters. ML modeling engine 130 may include model selector engine 132 (e.g., configured to select a model from among a plurality of models, such as based on input data), parameter selector engine 134 (e.g., configured to add, remove, and/or change one or more parameters of a model), and/or model generation engine 136 (e.g., configured to generate one or more machine learning models, such as according to model input data, model output data, comparison data, and/or validation data).

Figure 20:
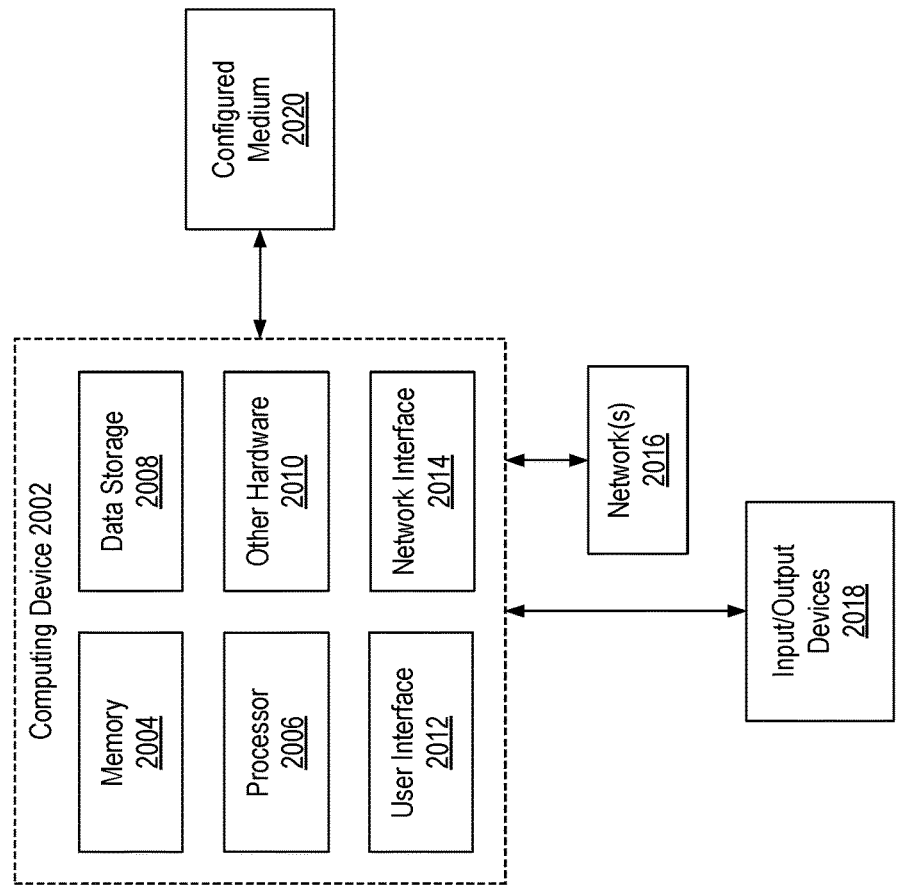
FIG. 20 is a block diagram illustrating an example of an operating environment for implementing various aspects of this disclosure.

In some of the disclosed methods and systems, model selector engine 132 may be configured to receive input and/or transmit output to ML algorithms database 190 (e.g., data storage 2008 in FIG. 20). ML algorithms database 190 (or other data storage) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 100 can further include predictive output generation engine 140, output validation engine 150 (e.g., configured to apply validation data to machine learning model output), feedback engine 170 (e.g., configured to apply feedback from a user and/or machine to a model), and model refinement engine 160 (e.g., configured to update or re-configure a model). In some of the disclosed methods and systems, feedback engine 170 may receive input and/or transmit output (e.g., output from a trained, partially trained, or untrained model) to outcome metrics database 180. Outcome metrics database 180 may be configured to store output from one or more models and may also be configured to associate output with one or more models. In some of the disclosed methods and systems, outcome metrics database 180, or other device (e.g., model refinement engine 160 or feedback engine 170) may be configured to correlate output, detect trends in output data, and/or infer a change to input or model parameters to cause a particular model output or type of model output. In some of the disclosed methods and systems, model refinement engine 160 may receive output from predictive output generation engine 140 or output validation engine 150. In some of the disclosed methods and systems, model refinement engine 160 may transmit the received output to featurization engine 120 or ML modelling engine 130 in one or more iterative cycles.

Any or each engine of system 100 may be a module (e.g., a program module), which may be a packaged functional hardware unit designed for use with other components or a part of a program that performs a particular function (e.g., of related functions). Any or each of these modules may be implemented using a computing device. In some of the disclosed methods and systems, the functionality of system 100 may be split across multiple computing devices to allow for distributed processing of the data, which may improve output speed and reduce computational load on individual devices. In some of the disclosed methods and systems, system 100 may use load-balancing to maintain stable resource load (e.g., processing load, memory load, or bandwidth load) across multiple computing devices and to reduce the risk of a computing device or connection becoming overloaded. In these or other disclosed methods and systems, the different components may communicate over one or more I/O devices and/or network interfaces.

System 100 can be related to different domains or fields of use. Descriptions of some of the disclosed methods and systems related to specific domains, such as natural language processing or language modeling, is not intended to limit the disclosed methods and systems to those specific domains, and systems and methods consistent with the present disclosure can apply to any domain that utilizes predictive modeling based on available data.

Figure 2:
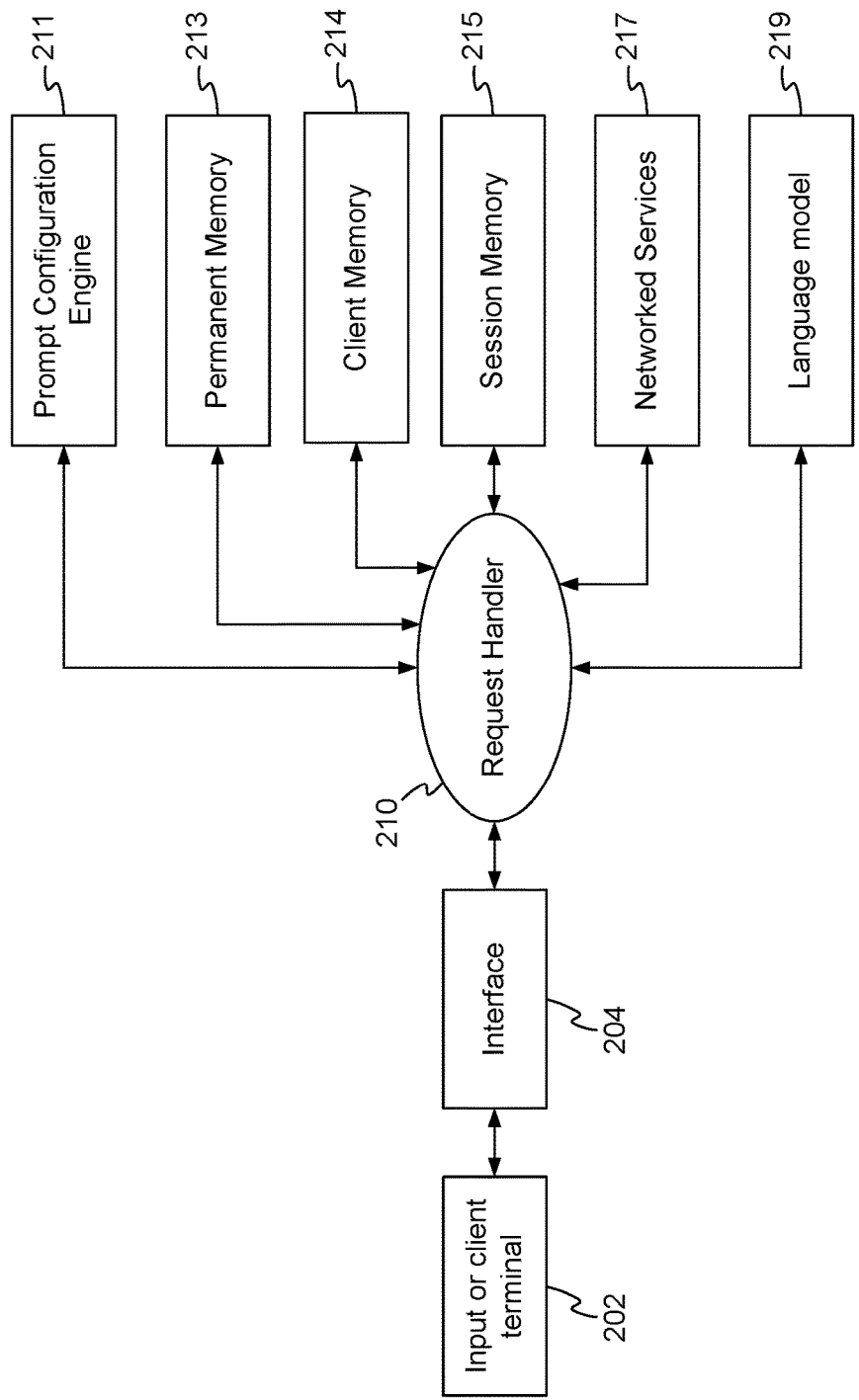
FIG. 2 is a block diagram describing an example system for handling and/or resolving prompts in a computer model system according to various aspects of the present disclosure.

FIG. 2 is a block diagram describing an example system 200 for handling and/or resolving prompts in a computer model system according to various aspects of the present disclosure. System 200 may be implemented with elements discussed in system 100. For example, system 200 may be implemented with engines 140 and 150. Alternatively, or additionally, system 200 may be implemented with elements of environment 2000 (described in connection with FIG. 20). Other implementations are possible too.

System 200 may include an input or client terminal 202, an interface 204, and a request handler 210. System 200 may further include a prompt configuration engine 211, a permanent memory 213, a client memory 214, a session memory 215, networked services 217, and language models 219.

Request handler 210 may be software or hardware that is configured to receive inputs, process them, transmit requests to other elements of system 200 and prepare and output responses. Request handler 210 may be configured to receive requests (e.g., user prompts and/or requests from a computer) and communicate with a model (such as a language model).

Request handler 210 may monitor the status requests, from initial reception to response transmission. For example, request handler 210 may first receive an input, (e.g., where a user or computer system sends a prompt through a web interface, mobile app, or API). Request handler 210 may receive an input (e.g., in the form of an HTTP request containing the query or prompt), then request handler 210 may be configured to perform parsing and validation to ensure that the input meets system requirements, such as proper format, input length, or completeness. Request handler 210 may also perform optional security checks, like rate limiting or input sanitization, to protect the system from malicious activity.

In some systems, request handler 210 may be configured to support sessions (e.g., in chat applications where it is generally desired to maintain context across multiple interactions). In such implementations, request handler 210 may retrieve, initiate, or terminate sessions using a session ID or API key. This feature can permit system 200 to maintain a conversation or session context, ensuring continuity across interactions, and (as further discussed below) initiate session-specific requests and memories. And this feature may allow system 200 to, as further discussed below, generate combined prompts that leverage information stored in session memory. Moreover, request handler 210 may be configured to support requests generated by other systems or computers. Request handler 210 can be configured to be connected with (e.g., via interface 204) or controlled by (e.g., via a GUI) other systems or software that autonomously generate requests for system 200. For example, request handler 210 may be configured to support automated systems within digital environments having one computer system controlling or using a different computer system. In such scenarios, request handler 210 may be configured as an agent or service for a different client or principal computer environment. Request handler 210 can be configured to autonomously, or semi-autonomously, perform tasks requested by other autonomous, or semi-autonomous, computer systems in a computer using agent interaction where one computer system autonomously controls system 200 to perform tasks derived from a user prompt. Request handler 210 can act as an agent that receives requests from a computer system to perform data analysis, web scraping, process automation, and/or decision-making. Request handler 210 can be configured with algorithms that allow request handler 210 to interpret inputs, process information.

Request handler 210 may also perform operations for processing requests. For example, request handler 210 can tokenize inputs, breaking them into smaller units (words or subwords) that are compatible with a computer model. Request handler 210 may also inject additional metadata to prompts, add context, and/or generate combined prompts. For example, request handler 210 may combine specific instructions, previous answers, or parameters to guide the model's behavior. Request handler 210 may also perform operations like text normalization, language translation, or entity extraction.

Request handler 210 may also communicate with other elements in system 200 to process requests. For example, request handler 210 may be configurable to select an appropriate computer model to handle the request. This could be based on the type of query, performance constraints, or user preferences. Request handler 210 may communicate with the selected model, sending the tokenized input and any relevant metadata as part of the API request. As another example, request handle 210 may be configured to route other computer system requests.

Request handler 210 may also process a model response. For example, when a model responds, request handler 210 can process the model response (e.g., request handler 210 can detokenize a model output to make it human-readable).

Request handler 210 may also filter or modify the response to ensure it aligns with system guidelines, removing inappropriate content or reformatting the response if necessary. Further, in implementations using sessions, request handler 210 may update memories, such as session memory 215, to reflect the latest interaction, ensuring that future user queries are informed by past responses. Request handler 210 may also modify the response (e.g., for accurate formatting and/or to adjust to user preferences), such as preparing the response in JSON (JavaScript Object Notation) format for an interface 204 that is an API or rendering it in HTML when interface 204 is a web interface.

Request handler 210 may also prepare a response for transmitting via interface 204. When interface 204 uses an API-based system, request handler 210 may generate a response to be transmitted as an HTTP response with status codes indicating success or failure. In addition to delivering the response, request handler 210 may be configured to log details of the transaction, including request metadata, response time, and any errors encountered.

While FIG. 2 shows a single request handler 210, multiple request handlers can be used in system 200 and they can be deployed in multiple servers, multiple principal-agent system configurations, and/or computer systems. In such scenarios, system 200 may include a load balancer (not shown) that distributes user requests across the available servers, preventing any one node from becoming overwhelmed. Load balancers can facilitate scaling, allowing system 200 to accommodate more users by adding additional request handlers 210 as demand increases, ensuring that the system remains responsive under high traffic conditions. This architecture ensures that requests are processed efficiently and reliably, with clear error handling, session management, and performance tracking in place to deliver a high-quality user experience.

Input or client terminal 202 may include software or hardware that allows users and/or principal computers to input requests to be resolved with an agent computer model. Terminal 202 may capture requests (e.g., instructions to perform specific) and/or prompts (e.g., inputs to an LM) and transmit requests and/or prompts to a computer model. In system 200, requests can include prompts (e.g., instructions can include prompts) and prompts can include requests (e.g., the prompts can specify instructions for specific operations). Terminal 202 can take various forms, such as a web-based application, mobile app, client server, and/or desktop software, allowing input of queries or commands. Terminal 202 may be configured to generate packages for transmission via interface 204. Terminal 202 may add metadata (e.g., user session data or preferences) to facilitate transmission of requests via interface 204. Terminal 202 may also be configured to display messages in user-friendly format, with options for follow-up questions, session management, or interaction customization. Terminal 202 may also be configured to support functions like validation, security/authentication, history tracking.

Interface 204 may be configured to permit communication of prompts and responses between terminal 202 and request handler 210. Interface 204 may facilitate interaction across elements in system 200 and be embodied with platforms like web interfaces and APIs. Interface 204 can process requests and/or prompts (e.g., entered in terminal 202) and interface 204 can transmit the input to request handler 210. Interface 204 can be embodied with a web interface or with API-based tools. Interface 204 may also communicate responses from request handler 210 to terminal 202. For example, interface 204 may receive responses, processes them if needed, and transmits it back to terminal 202. Interface 204 implemented as APIs can be used to integrate computer models with third-party applications, enabling embedding of natural language understanding capabilities into diverse software environments, from mobile apps to enterprise systems. For example, when system 200 is configured as part of computer principal-agent configurations (e.g., system 200 acts as an agent for a different connected computer) interface 204 may be configured to receive tasks within a digital environment. Interface 204, whether web or API, can also be configured to perform logging and validation (error checking) operations.

Prompt configuration engine 211 may be software or hardware configured to dynamically assemble and structure prompts before they are tokenized and sent to a computer model. Prompt configuration engine 211 may generate prompts that combine various elements, such as system instructions, user inputs, and contextual information, to create a coherent and well-defined prompt that optimally guides the model behavior. Prompt configuration engine 211 may be configured to collect instructions (e.g., querying permanent memory 213, session memory 215, and/or request handler 210), extract contextual data from memories, and incorporate system instructions. Prompt configuration engine 211 may also be configured to generate sub-prompts (such as portions of a prompt, tokens, and/or partial instructions) and strategically arrange sub-prompts in a combined prompt. The arrangement in prompt configuration engine 211 may be set to use a user prompt and contextual elements in a specific order, ensuring clarity and focus. Additionally, prompt configuration engine 211 may include marks or indications in a prompt to allow a computer model to identify different portions of the prompt. For example, prompt configuration engine 211 may include in combined prompts opening and closing symbols to identify sub-prompts, textual user instructions, and/or responses. Further, prompt configuration engine 211 may add special tokens or delimiters, to separate different parts of the prompt. Depending on the use case, prompt configuration engine 211 may be configured to adjust or modify certain aspects to better align prompts with intended outcomes. For example, prompt configuration engine 211 may apply prompt engineering algorithms to craft prompts and sub-prompts that give the model precise instructions, examples, and necessary context information (like private or specialized information that wasn't included in the training data).

The prompts generated with prompt configuration engine 211 can improve the quality and accuracy of the model's output. Prompt configuration engine 211 may be accessible via APIs and be used to create prompts by providing an array of messages, instructions, or sub-prompts that contain instructions for the model. Each message, instruction, or sub-prompt can have a different role, which influences how the model might interpret the input. For example, a user instruction sub-prompt may include instructions that request a particular type of output from the model. User instruction sub-prompts may include the messages users input in an AI system, or part of them to improve token efficiency. System sub-prompts or messages include prompts that would guide the system to respond with a specific behavior in top-level instructions. Context sub-prompts or messages can be generated by the model, like in a previous response and/or in a previous generation request. Context sub-prompts or messages can also be used to provide examples to the model for how it should respond to the current request in a technique known as few-shot learning.

As discussed in connection with FIG. 6, giving the model additional data using a combination of prompts and sub-prompts with different purposes can improve the accuracy of the model response. Having a variety of sub-prompts or messages combined in a system-generated targeted prompt improves token efficiency and reduces the number of interactions needed to reach a desirable or acceptable response. Further, the use of a combined prompt can provide additional information to the model, which may be outside its training data. For example, prompt configuration engine 211 can merge results of a database query, a text document, or other resources to help the model generate a relevant response in techniques such as Retrieval Augmented Generation (RAG).

Permanent memory 213 may be software or hardware that stores fixed knowledge or instructions. Permanent memory 213 may be stored in the model's neural network as patterns of weights and connections, allowing the model to generate responses and understand context based on the data it was trained on. Unlike temporary session memory used during conversations, permanent memory is static and cannot be updated without retraining the model. Permanent memory 213 provides the model with general knowledge but lacks the ability to learn from new interactions or access real-time information. Additionally, or alternatively, permanent memory 213 may be configured to store session independent instructions such as system instructions. System instructions may include predefined guidelines or directives that shape how the model behaves when generating responses regardless of conversations in specific sessions. Systems instructions can guide the model on aspects like tone, format, style, or task-specific requirements. For example, system instructions may include instructions that get incorporated in combined prompts as system sub-prompts that, for example, request responses with a specific tone such as formal, simple, and/or complex explanations.

Client memory 214 may be implemented with hardware or software that gives system 200 the capability to store contextual information associated with a client across different sessions. Client memory 214 may be implemented as a type of intermediate memory in system 200 that bridges session memory 215 and permanent memory 213. Unlike session memory 215, which is configured to retain information for a session, client memory 214 can retain information across multiple sessions and conversations with a user, client, or principal, allowing for a more personalized and consistent experience over different sessions. However, unlike permanent memory 213, client memory 214 is not static; it can be cleared, updated, or selectively forgotten as needed. For example, if a user frequently asks for information to be outputted in a "explain like I am five" or JSON format, client memory 214 can retain this preference across different sessions, enabling computer models to adjust responses to match the client or principal preference based on other sessions. Client memory 214 can also retain specific information across sessions (e.g., client memory 214 can store programming syntax preferences). Client memory 214 can also learn patterns in requests or include updated information in responses across different sessions thereby providing continuity without requiring iterative inputs or modification of a permanent storage. Unlike permanent memory 213, client memory 214 can be configured to be flexible to adapt to changes over time, allowing the system to update preferences based on interactions and clear outdated or not used information.

Session memory 215 may be implemented with hardware or software that gives system 200 the capability to temporarily store contextual information about ongoing interactions in a session. As discussed in FIG. 6, multiple sub-prompts can be combined to form a combined prompt that results in more accurate model responses. Session memory 215 may allow system 200 to maintain consistency between multiple exchanges by keeping track of user inputs, previous responses, and relevant details provided during a session. Session memory 215 may be configured to handle transient data, meaning that it only retains information for the duration of the session. Session memory 215 may store information of previous interactions to incorporate in subsequent prompts and/or responses. Session memory 215 may be configured to be cleaned or deleted once a session ends. The manner in which a session may end can vary. For example, in some scenarios system 200 may terminate a session based on a time-based expiration that ends the session after a period of inactivity (e.g., system 200 may end a session if there is no interaction in a month) and remove temporary data when the time expires. Alternatively, or additionally, system 200 may end a session based on a user reset or clear request. For example, system 200 can terminate a session when a user deletes a conversation threat. As another example, system 200 may process a prompt or request such as "terminate this conversation" by closing the session or conversation, removing any active session memory, and ending the session. Additionally, or alternatively, system 200 may end a session with a log-off event. For example, system 200 may end a session when determining a user logs off or closes a session (e.g., when closing a browser window, selecting "sign out," or sending a close API request). Further, in some cases system 200 may end sessions periodically to optimize performance and uphold privacy standards, regardless of user activity. Moreover, session memory 215 may be configured to operate in isolation for the session and erased once the session ends.

Further, session memory 215 may be configured to store temporary variables such as user instructions, conversational history, and relevant contextual details. For instance, if request handler 210 receives a user prompt for following-up answers or refining their question, session memory 215 may store previous responses and previous prompts to include that information in prompts, or sub-prompts, for targeted replies. Session memory 215 may be configured as dynamic and real-time memory to facilitate coherent responses, ensuring that the model remembers earlier parts of the conversation and adapts to the user's evolving input. Session memory 215 may also manage token limits. For example, session memory 215 may be configured to track number of tokens used in a session. Further, session memory 215 may be configured with compiling, deleting, or compression functions to meet system limit requirements.

Networked services 217 may be computer models with specific functions and/or configurations. Networked services 217 may be accessible via APIs and they may offer cloud-based functionality. Networked services 217 may provide specialized capabilities such as image and video generation from text descriptions. Networked services 217 may be configured to be accessible remotely and access remote computing resources and/or deep learning models.

Language models 219 may be computer models accessible through APIs with capabilities for generating text responses based on diverse inputs. Language models 219 may use deep learning architectures and transformers, and be trained on vast datasets. Language models 219 can receive and transmit information through APIs to perform various tasks like content generation, summarization, translation, code writing, or even complex problem-solving, without needing the computational infrastructure to train or deploy such models themselves.

In some systems, request handler 210 can use language models 219 and networked services 217 via API calls using a REST API from an HTTP client or SDKs. In transmitting requests to language models 219 and networked services 217, request handler 210 may specify a type of model that will perform inferences. For example, request handler 210 may evaluate system resources and pick one from a video generation model; a large language model with very high level of intelligence and strong performance, but having a higher cost per token; a small model with lower performance and less cost per token; an image generation model; or a reasoning model with slower results, and less token efficiency but enhanced capability for advanced reasoning, coding, and multi-step planning. This ability of system 200 to generate targeted prompts and select the most suitable model improves the overall system efficiency and can result in improved model-generated responses.

Figure 3:
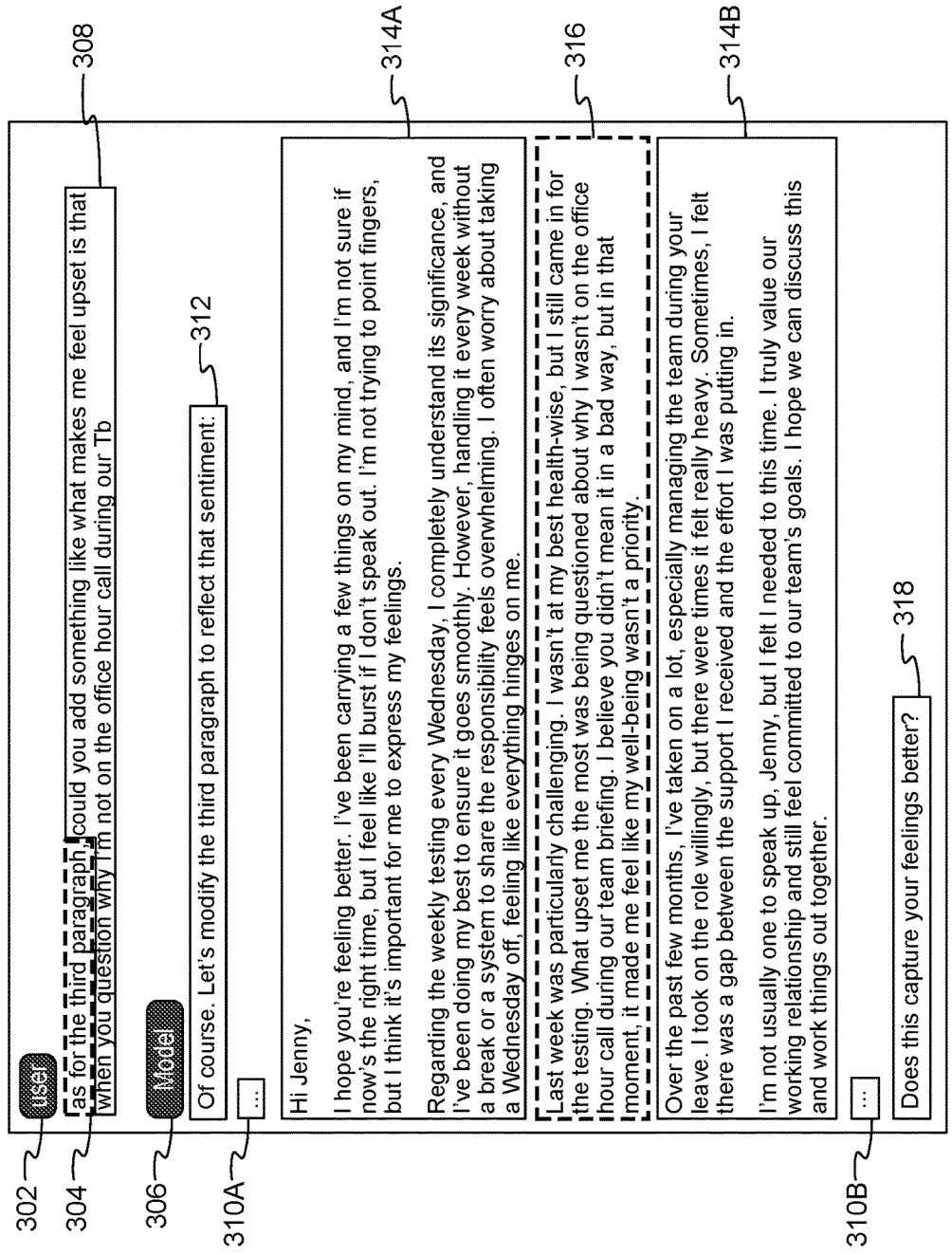
FIG. 3 is a first example of a graphical user interface describing interactions with a computer model according to various aspects of the present disclosure.

FIG. 3 is a first example of a graphical user interface (GUI) 300 describing interactions with a computer model according to various aspects of the present disclosure. As shown in FIG. 3, GUI 300 can be implemented as a text conversation having user indicator 302 marking user inputs and model indicator 306 marking model answers.

The input from users may include an input or prompt that includes a reference 304 and a user instruction 308. As described in FIG. 3, reference 304 may be pointing to a previous response by a model (e.g., "for the third paragraph in the last answer"). But reference 304 may also be pointing to a previous prompt, or different information that can be stored in session memory 215 (FIG. 2). Further, like in FIG. 3, reference 304 may be referring to only a portion of a response or prompt. Alternatively, however, reference 304 may refer to a complete response of prompt (e.g., "in the last answer"). Further, reference 304 may refer to a segment of a previous response or prompt specifying a word, a paragraph, a sentence, and/or a phrase in a previous response (e.g., a first response during a session).

User instruction 308 may describe a modification or operation that is contextualized with reference 304. As shown in FIG. 3, user instruction 308 may ask for adding, modifying, and/or removing a previous response. User instruction 308 may specify a modification of the segment in reference 304.

GUI 300 also shows an example response from a model under model indicator 306. The response may include a preamble 312 and markers 310A and 310B. The response may also include unmodified portions 314A and 314B, and a modified portion 316. In the example shown in FIG. 3, reference 304 and user instruction 308 asked for the modification of a specific portion of a previous answer. The unmodified portions 314A and 314B (not affected by reference 304) may thus remain the same as the content in a previous response (saving computer expenses to re-generate portions of the response). Modified portion 316, however, may be modified to include the addition, modification, and/or extraction in user instruction 308.

Further as shown in FIG. 3, responses may include feedback request 318 which may improve user interaction with computer models. Feedback request 318 may trigger additional feedback from users but also guide a follow-up prompt to provide specific information that can facilitate the generation of a subsequent more tailored response.

Figure 4:
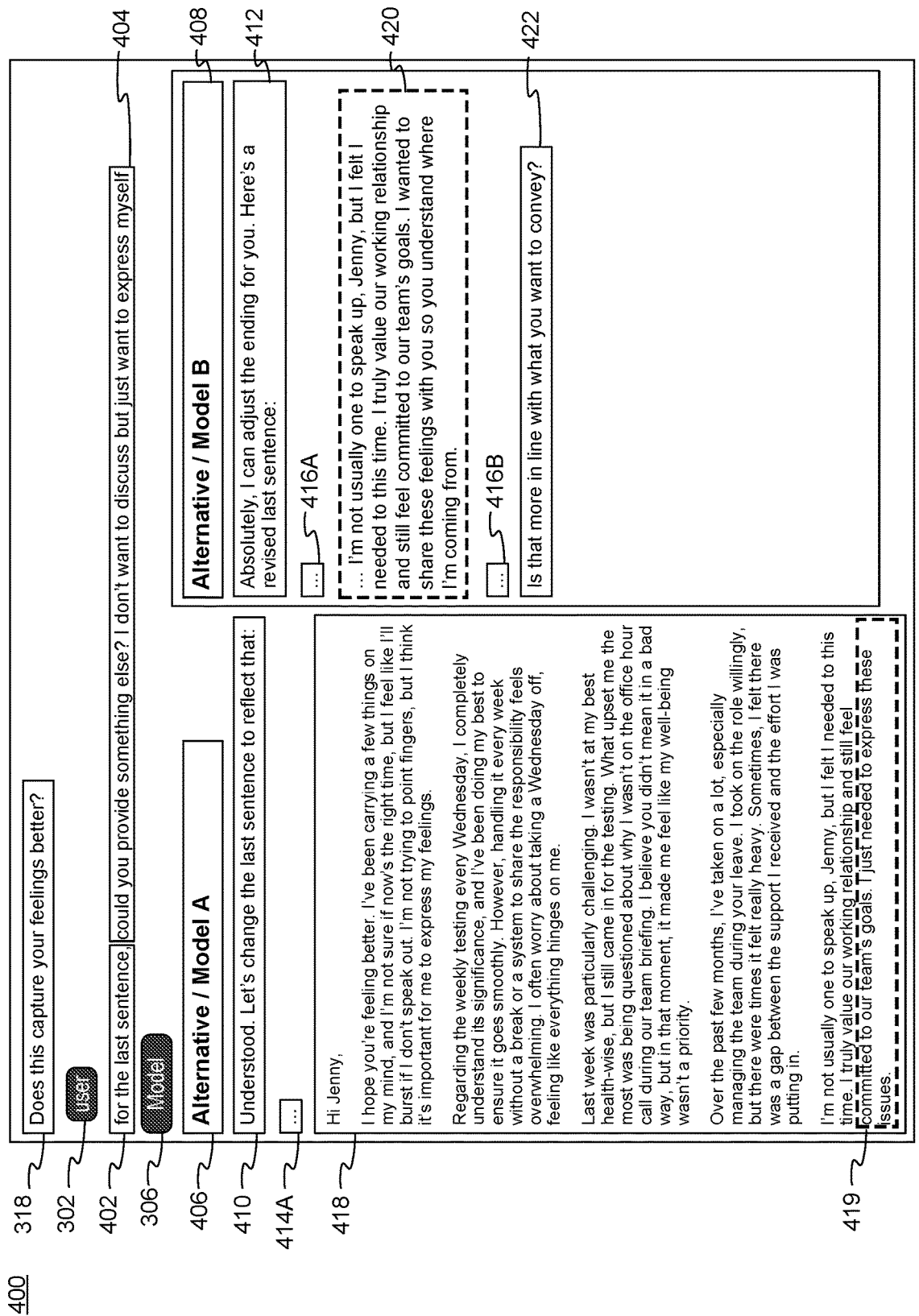
FIG. 4 is a second example of a graphical user interface describing interactions with a computer model according to various aspects of the present disclosure.

FIG. 4 is a second example of a graphical user interface (GUI) 400 describing interactions with a computer model according to various aspects of the present disclosure. FIG. 4 shows an example in which GUI 400 follows GUI 300. But such sequence is not necessary and in some embodiments GUI 400 is independent from GUI 300.

GUI 400 shows feedback request 318 and a user indicator 302. As shown in FIG. 4, a user may include again a prompt that has a second reference 402 and second user instruction 404. Second reference 402 points to a portion of unmodified portion 314B (FIG. 3), specifically pointing to "for the last sentence." And, similar to first user instruction 308, second user instruction 404 ask for a modification on that specific portion of the previous response.

As further discussed below, disclosed systems and methods allow a contextual interpretation of such prompt to generate a combined prompt that improves the response of the computer model, reduces the number of prompts that need to be issued to guide the model, and facilitate use of the computer model enabling quick references to previous conversations. The disclosed systems thus permits faster and more efficient interaction with computer models (like LMs) because prompts can be manipulated by the system to create more meaningful responses with less prompting and reduced tokens.

As shown in FIG. 4, different answers can be provided in response to the targeted prompt from the user with second reference 402 and second user instructions 404. A first answer 406 may include a preamble 410, a marker 414A, and an updated response 418 including a modified portion 419. A second answer 408 may include a preamble 412 markers 416A and 416B, a targeted response 420, and a feedback request 422. As shown in FIG. 4, first answer 406 and second answer 408 may be implemented with different models permitting users to do A/B testing or evaluation of different models and response. For example, one answer may be generated with a faster or less expensive model (for computational efficiency) while the other may be generate with a larger model tuned for accuracy instead of efficiency (but being configured to only provide a short response focused only on the modified portion). The use of multiple or alternative responses along with feedback requests 422 can reduce the number of subsequent prompts and the number of processed tokens to alleviate computation burden. For example, second or follow-up responses can include alternative responses or a feedback request, with the alternative responses including at least two options resolving the combined prompt. Second or follow-up responses can also include feedback request 422 including a question. The alternative responses can guide users to provide more effective prompts by, for example, identifying areas where the model had alternative predictions and could use user feedback to narrow options. Further, while FIG. 4 shows first answer 406 and second answer 408, the alternative answers can be transmitted to a computer system that can itself evaluate the responses. For example, in situations where a principal computer generates a query (e.g., in a principal-agent configuration), the principal computer can use the A/B answer shown in FIG. 4 to identify the better selection of an answer automatically or semi-automatically.

Figure 5:
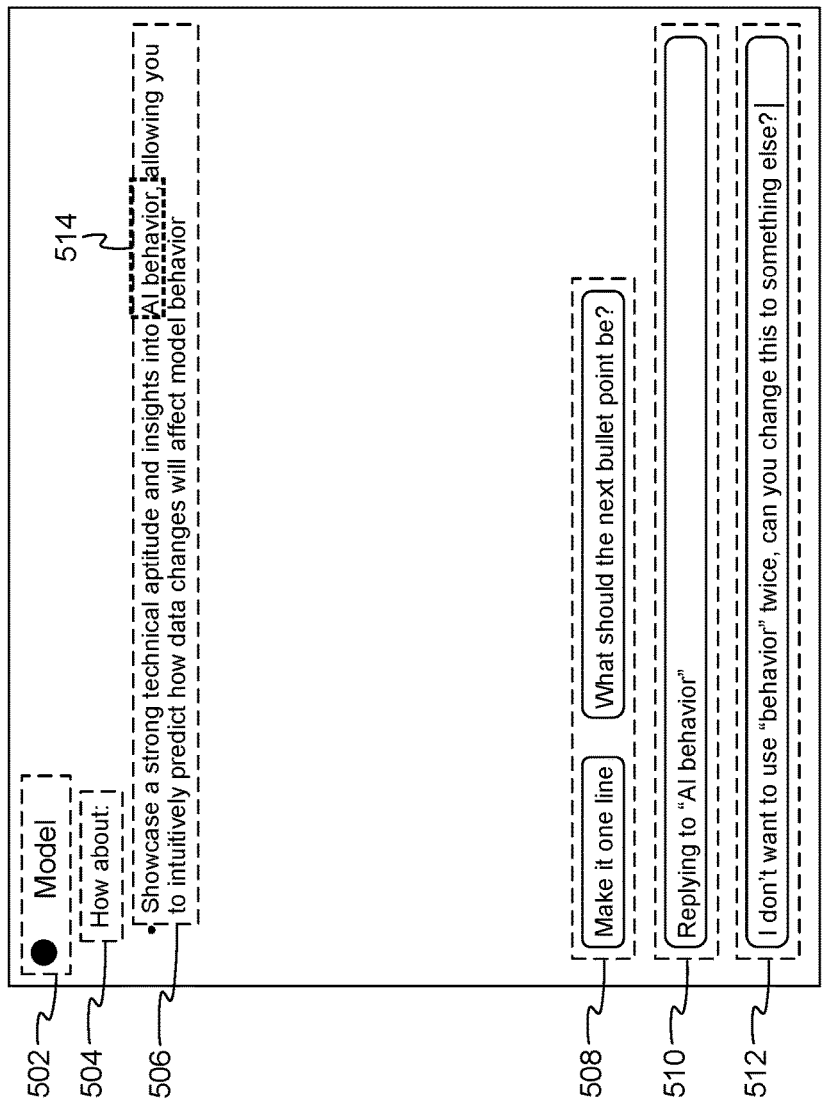
FIG. 5 is a third example of a graphical user interface describing interactions with a computer model according to various aspects of the present disclosure.

FIG. 5 is a third example of a graphical user interface GUI 500 describing interactions with a computer model according to various aspects of the present disclosure. As shown in FIG. 5, GUI 500 includes a model indicator 502 (which is shown as different from model indicator 306 but could be implemented as the same), a preamble 504, and a model response 506.

GUI 500 also permits a user to interact with model response 506 graphically by selecting a portion of model response 506. For example, as shown in FIG. 5, GUI 500 allows a user to highlight or select portion 514 of model response 506. This type of simple interaction with models improves prompt accuracy and improves the efficiency and performance of the computer models. Prompt accuracy improves efficiency by allowing more reliable and consistent outputs from computer models. For example, prompt accuracy can result in targeted responses, based on user context, that require less computational expenses to successfully resolve a query. Prompt accuracy can also minimize the length of prompts that needs to be parsed and tokenized to generate a response. Prompt accuracy not only enhances the quality of results for complex tasks such as code generation or data analysis but also streamlines the interaction process, reducing the need for multiple iterations to minimize response. The improved prompt accuracy achieved with systems like the one in GUI 500 translates to time and resource savings, allowing users to accomplish their goals more effectively.

GUI 500 also includes prompt suggestions 508. In some embodiments, system 100 or system 200 may be configured to evaluate user interactions (such as the selection of select portion 514 or input of a prompt) and generate prompt suggestions 508 based on user input or selections, previous responses, and/or previous prompts. Additionally, GUI 500 may include a message box 510. Message box 510 may be configured to dynamically display a message based on user selection. For example, as shown in FIG. 5, message box 510 may be configured to replicate select portion 514. Message box 510 may improve user interactions by providing feedback to users regarding the targeted prompt inputs or the type of information that the model will be considering in the next response. GUI 500 may also include an input box 512. Input box 512 may be configured to receive user prompts and/or instructions. The combination of elements with prompt suggestions 508, message box 510, and input box 512, may form a composer that is configured to capture user inputs and/or facilitate user interaction with computer model.

Figure 6:
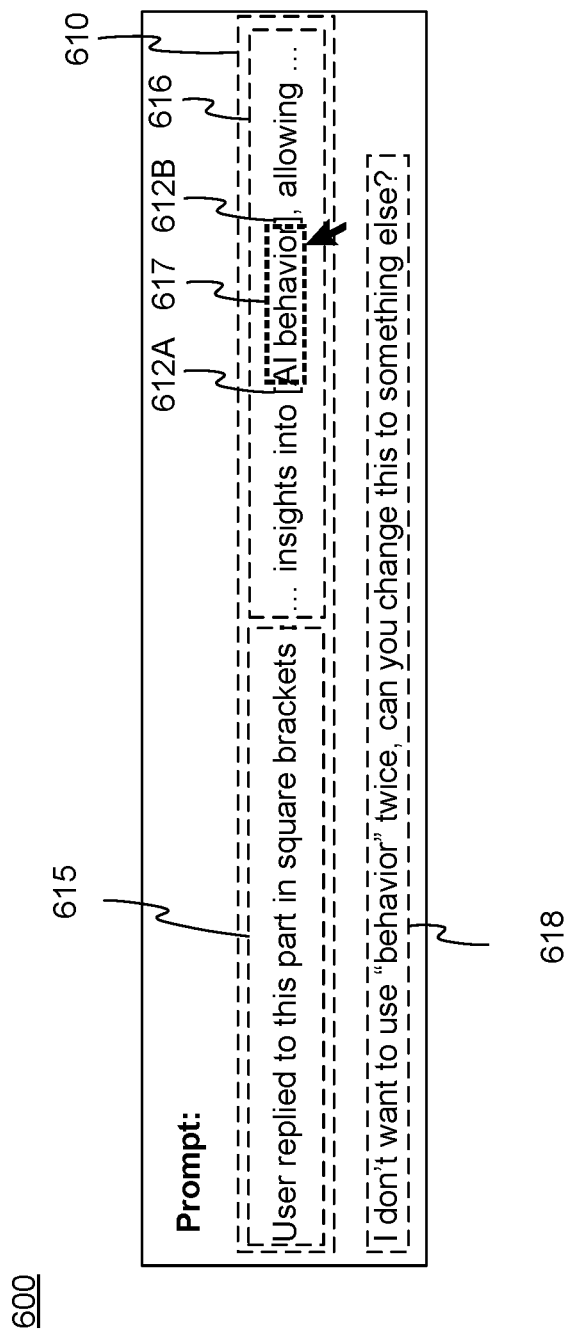
FIG. 6 is an example of a prompt generated for targeted interactions with a computer model according to disclosed embodiments of the present disclosure.

FIG. 6 is an example of a prompt 600 generated for targeted interactions with a computer model according to disclosed embodiments of the present disclosure. In some embodiments, as further discussed in connection with FIG. 2, prompt 600 may be generated by combining different instructions, sub-prompts, or messages to generate a prompt that will receive a more accurate response by providing the necessary context and instruction to the model. By generating prompts like prompt 600, the disclosed systems and methods improve the operation of the model by allowing efficient and accurate prompting.

As shown in FIG. 6, prompt 600 may include different sections or sub-prompts. For example, prompt 600 may include a context sub-prompt 610 that is generated by the system to provide context of where the user is seeking a targeted reply. Context sub-prompt 610 may include a preamble 615 and a reference quote 616 to at least a portion of a segment of a previous response or prompt, the quote can include opening delimiters 612A and closing delimiters 612B that highlight to the model a specific portion of quote 616. Reference quote 616 may also include a reference to, for example, a previous response or a previous prompt that the user has called for in a prompt for a targeted reply. As shown in FIG. 6, reference quote 616 may include a selected portion 617. Selected portion 617 may be a portion of a previous response or prompt that the user has identified in its prompt. In the example of FIG. 6, selected portion 617 corresponds to select portion 514 in FIG. 5. This, however, is only an example and alternative portions can be replicated in selected portion 617. Additionally, reference sub-prompt 616 includes surrounding language to provide more information to the model for the targeted reply. In the example of FIG. 6 reference quote 616 added additional text before and after selected portion 617. The determination of the length of additional text in reference quote 616 may be dynamic and selected by the system to minimize the necessary input while also providing sufficient context for targeted replies. For example, request handler 210 (FIG. 2) may be configured to communicate with prompt configuration engine 211 to determine how much of the text in a previous response or prompt should be included in reference quote 616. Request handler 210 may evaluate variables such as prompt complexity (complex tasks generally require more context but simple queries, minimal context may be enough), selected model capabilities, output length/depth desired (more context often leads to more detailed responses), number of iterations (if a user keeps asking for modifications request handler 210 may increase the context volume), and computational resource constrains (request handler 210 may seek to minimize the volume of associated text if the system is limited by number of tokens).

Additionally, reference quote 616 may include opening delimiter 612A and closing delimiter 614A for selected portion 617 that can be used to signal computer models the specific portions of quote 616 for targeted response. For example, a computer model may be instructed that text between square brackets is text a user has specifically selected to take this instruction into account in the generation of the response and provide a more accurate response.

Prompt 600 may also include an instruction sub-prompt 618. Instruction sub-prompt may be based on, for example, a prompt a user enters in input box 512 (FIG. 5). Instruction sub-prompt may additionally or alternatively be based on a prompt a user selects in input box 508 (FIG. 5). This instruction sub-prompt may also be used for the generation of a prompt seeking a targeted reply.

A system, such as request handler 210 (FIG. 2) may combine context sub-prompt 610 and instruction sub-prompt 618 to form a combined prompt 600. Additionally, although not shown in FIG. 6, combined prompt 600 may also include system sub-prompts that are generated based on system instructions and/or instructions in permanent memory 213. This type of prompt generation that uses input from the user but supplements it with user selection, historic of conversations, and/or system instructions, improve the operation of the system by facilitating the generation of more accurate prompts that result in more accurate responses.

Moreover, the combined prompt generation may allow for the generating of prompts that take into account multiple interactions that have been stored in a session memory. While FIG. 6 shows an example with a first interaction, the system can be configured to generate combined prompts with multiple interactions. For example, as discussed in connection with FIGS. 9 and 10, a user may input follow-up or continuation prompts that seek to modify the response to a first targeted response (e.g., a user may ask to rephrase, change a specific sentence, or otherwise modify a first targeted response). In response to receiving such continuation prompt, the system can generate a second combined prompt including a second context sub-prompt and a second instruction sub-prompt to form a second combined prompt. The second context sub-prompt may have a segment of the new response (e.g., the first targeted response) and a segment of a past response (e.g., a previous response stored in session memory that was used for the generation of the first targeted response). Thus, the second combined prompt can use multiple sources of information including sub-prompts from different responses along a second instruction sub-prompt with the continuation or follow-up instructions.

Figure 7:
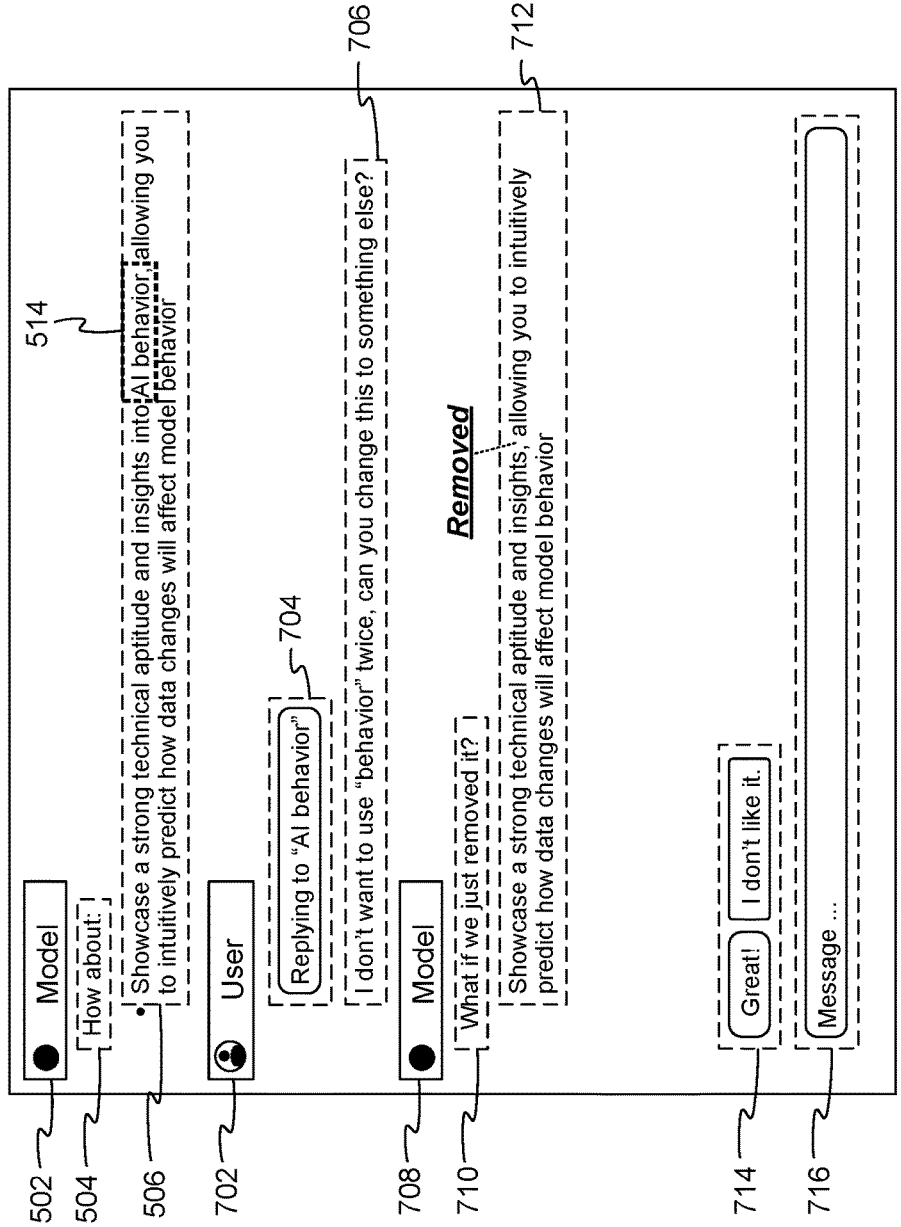
FIG. 7 is a fourth example of a graphical user interface describing interactions with a computer model according to various aspects of the present disclosure.

FIG. 7 is a fourth example of a graphical user interface (GUI) 700 describing interactions with a computer model according to various aspects of the present disclosure. GUI 700 may follow GUI 500. That is GUI 700 may be a continuation of GUI 500 after a user has inputted a prompt and a model generated a response. In other scenarios, however, GUI 700 may be independent from GUI 500.

GUI 700 includes model indicator 502, preamble 504, and model response 506. In addition, GUI 500 includes a user indicator 702, a user preamble 704, and a user prompt 706. User preamble 704 may replicate message box 510 to provide context to a user on the information that the system or model are using for generating the targeted response. This type of feedback may facilitate the determination of context for a subsequent prompt. User prompt 706 may include an instruction on how to modify the referenced response or prompt. As shown in FIG. 7, however, using the context from user-selected information in a previous reply facilitates the prompt and reduces its complexity. For example, in the example in FIG. 7 the user or client system identified the specific words that they want to be changed and why, without having to replicate the previous answer or without having to include a detailed description of a previous answer. The disclosed tools for targeted replies thus improve token efficiency.

GUI 700 also shows a second response. The second response includes a preamble 710 and a response 712 that modifies the previous response 506. The combined prompt described in FIG. 6, based on the different sub-prompts and user suggestions, can generate a targeted response like response 712 in which the model is able to perform the specific modification the user requested with simple yet effective prompting. Preamble 710 is specifically tailored to the user input and requests feedback for a more fluid conversation, and response 712 produces text with specific or targeted replies to user requests. GUI 700 can also include prompt suggestions 714, similar to prompt suggestion 508 (FIG. 5) and input box 716, similar to input box 512 (FIG. 5).

FIG. 8 is a fifth example of a graphical user interface (GUI) 800 describing interactions with a computer model according to various aspects of the present disclosure. GUI 800 includes user indicator 302 and model indicator 306. GUI also includes a first user instruction 802, a targeted response 804, a second user instruction 806 and a reference 808.

The example of FIG. 8 shows a situation in which first user instruction 802 does not specify a reference but the system determines a reference to a previous response based on the context of first user instruction 802. In some situations, when the user requests a modification but does not specify a reference point for the modification, the system may infer the modification should be based on an entire previous response. For example, GUI 800 shows first user instruction 802 as "I don't want bullet points." First user instruction does not include a reference to a previous response or prompt. But the system can be configured to infer the reference based on the context. In the example of FIG. 8, a previous response (not shown) used bullet points. Despite not including a user-specified reference, the system can infer that the modification of not having bullets should apply to the previous response having bullet formatting. Based on determining the reference in first user instruction 802, the system may generate a combined prompt with context sub-prompt and user instruction sub-prompt and generate targeted response 804 implementing the first user instruction 802.

GUI 800 also shows a situation in which a second user request includes a reference 808. Unlike the first request in GUI 800, the second request specifies second user instruction 806 and reference 808. As further discussed in connection with FIGS. 5-7, a system can use second user instruction 806 and reference 808 to generate a combined prompt seeking a targeted response generated by a computer model such an LM. The prompting sequence and mechanism described in GUI 800 may permit faster interactions with the model, with less complex user prompting (as the system can generate a combined prompt with the necessary details) that result in a lower number of prompts to achieve a targeted response.

Figure 9:
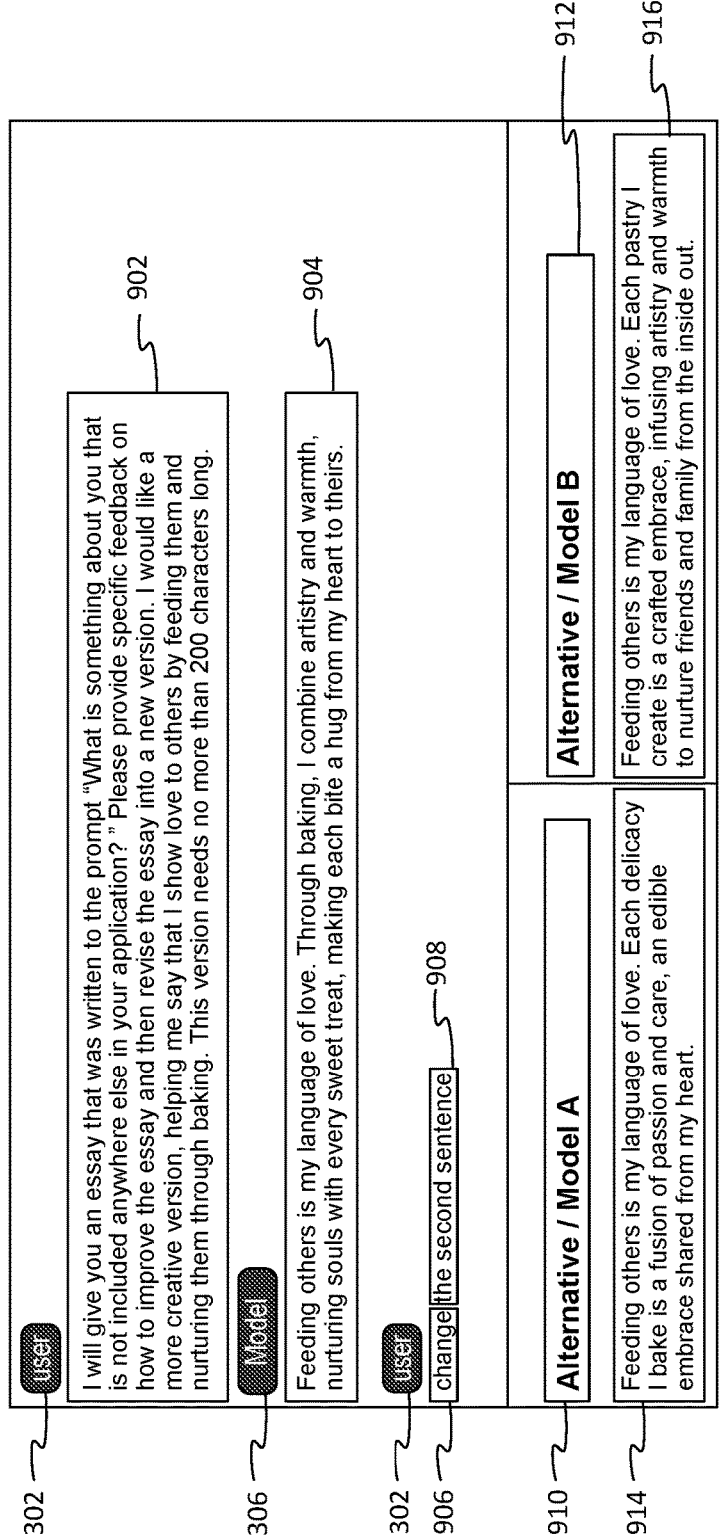
FIG. 9 is a sixth example of a graphical user interface describing interactions with a computer model according to various aspects of the present disclosure.

FIG. 9 is a sixth example of a graphical user interface (GUI) 900 describing interactions with a computer model according to various aspects of the present disclosure. GUI 900 includes user indicator 302 and model indicator 306. GUI also includes a first user instruction 902, a first response 904, a second user instruction 906, and a reference 908. Additionally, GUI 900 includes a first response type 910, a second response type 912, a first alternative response 914 and a second alternative response 916.

The example in FIG. 9, shows a scenario where first user instruction 902 includes a user instruction for modifications for a new "more creative version" and a reference to a previous prompt ("I will give you an essay to the prompt "What is something about you that is not included anywhere else in your application?"). A system may parse first user instruction 902 to determine the user instruction (or instructions) and the reference to the previous response (or prompt in this case). As discussed in connection with FIG. 6, the system may generate the combined sub-prompt seeking reduction of the number of tokens that would be transmitted to, for example, the LM or a networked service. For example, in generating a combined prompt based on first user instruction 902 a system may choose to remove or truncate portions of the prompt (e.g., removing phrases that do not provide context such as "I will give you" or "please" or "the essay into a new version") so that the token count is reduced. In this way, the system can reduce computational expenses to resolve a targeted request and generate a more efficient targeted response.

First response 904 may then respond to the query in first user instruction 902 and generate a targeted response meeting the conditions and using the context provided in first user instruction 902. This first response 904 can more directly address the user request by incorporating in its response the necessary context.

Second user instruction 906 may then request a modification to a portion of the previous response that is identified by reference 908. In the example in FIG. 9, the new user request asks for a "change" and then specifies the portion of the previous answer via reference 908 for the modification (identify the second sentence).

The system may again generate a combined prompt and generate alternative responses as shown in FIG. 9. For example, the system may generate a combined prompt using second user instruction 906 and reference 908 transmit it to alternative models or services in the system (e.g., system 200) and provide first response type 910, second response type 912, first alternative response 914 and second alternative response 916 allowing users to select responses from different models in an A/B comparison to minimize the number of required interactions and more closely match the intended request. The example of FIG. 9 shows a configuration in which a system can improve system efficiency with the generation of a combined prompt for targeted reply and providing alternative responses to prevent additional prompts, capture user feedback proactively (which may facilitate finetuning and developing of preferences in a session memory) and create a faster system that makes it easier to interact with the LM. Further, a principal or client computer system can select between alternative responses in an integrated digital environment where the "user" is a different computer system that autonomously, or semi-autonomously, controls or connects to an agent computer system, e.g., via interface 204 or in a computer using agent system as discussed in connection with FIG. 2.

FIG. 10 is a seventh example of a graphical user interface (GUI) 1000 describing interactions with a computer model according to various aspects of the present disclosure. GUI 1000 includes user indicator 302 and model indicator 306. GUI 1000 also includes a first user instruction 1002 and a context input 1004. As shown in FIG. 10, context input 1004 includes a point reference 1026. GUI 1000 also includes a preamble response 1006 and a targeted response 1010 that includes a modification 1008. GUI 1000 also includes a second user instruction 1012, first response type 1014, second response type 1020, first alternative response 1018, and second alternative response 1022. Additionally, GUI 1000 can include a classifier 1016.

In the example of FIG. 10, the user request includes first user instruction 1002, but instead of including a reference to a previous response or prompt, the user query includes a context input 1004 that specifies the context for the query. While the system may be configured to leverage previous responses and prompts to minimize required user input, as shown in FIG. 10 the system can also take context within the user prompt (here the context is specified in context input 1004). In such scenario the system can generate a combined prompt that reduces the prompt to minimize the number of tokens transmitted to the computer model or the network service. For example, a request handler may identify on a portion of context input 1004 as relevant (e.g., transmitting the first sentence of context input 1004) to minimize the number of tokens transmitted to the model. As shown in FIG. 10, context input 1004 may include a symbol to mark a point reference 1026 that specifies where user instruction 1002 should be focused or performed.

As shown in FIG. 10, the model generates a preamble response 1006 and a targeted response 1010 including a modification 1008. In the example of FIG. 10, modification 1008 is specific for context input 1004 and more particularly to the portion marked with point reference 1026. Targeted response 1010 may provide a specific change to the context input 1004 based on first user instruction 1002.

GUI 1000 also shows a second user instruction 1012. In some situations, users may send follow-up requests to make additional modifications. Second user instruction 1012 may describe a type of modification (e.g., a change in phrasing), a reference, and instructions. A system may process second user instruction 1012 to generate a combined prompt for a targeted reply. However, as shown in FIG. 10 second user instruction 1012 may include an open-ended query. In such situations, the system may be configured to generate alternative responses, such as first alternative response 1018 and second alternative response 1022 to, similar as the example shown in FIG. 9, provide users different options, collect feedback faster, an minimize follow-up prompts.

GUI 1000 also includes classifier 1016 that provides tags of information about a response in, for example, first alternative response 1018. Information in classifier 1016 may provide background variables the model employed for a response so that a user can later tweak for a different or more targeted response. For example, in the example of FIG. 10, classifier 1016 specifies a "Task: Knowledge." A user may use this information to further refine a response. For example, a user may provide in subsequent prompt a change of task from knowledge to "Task: Personal."

Figure 11:
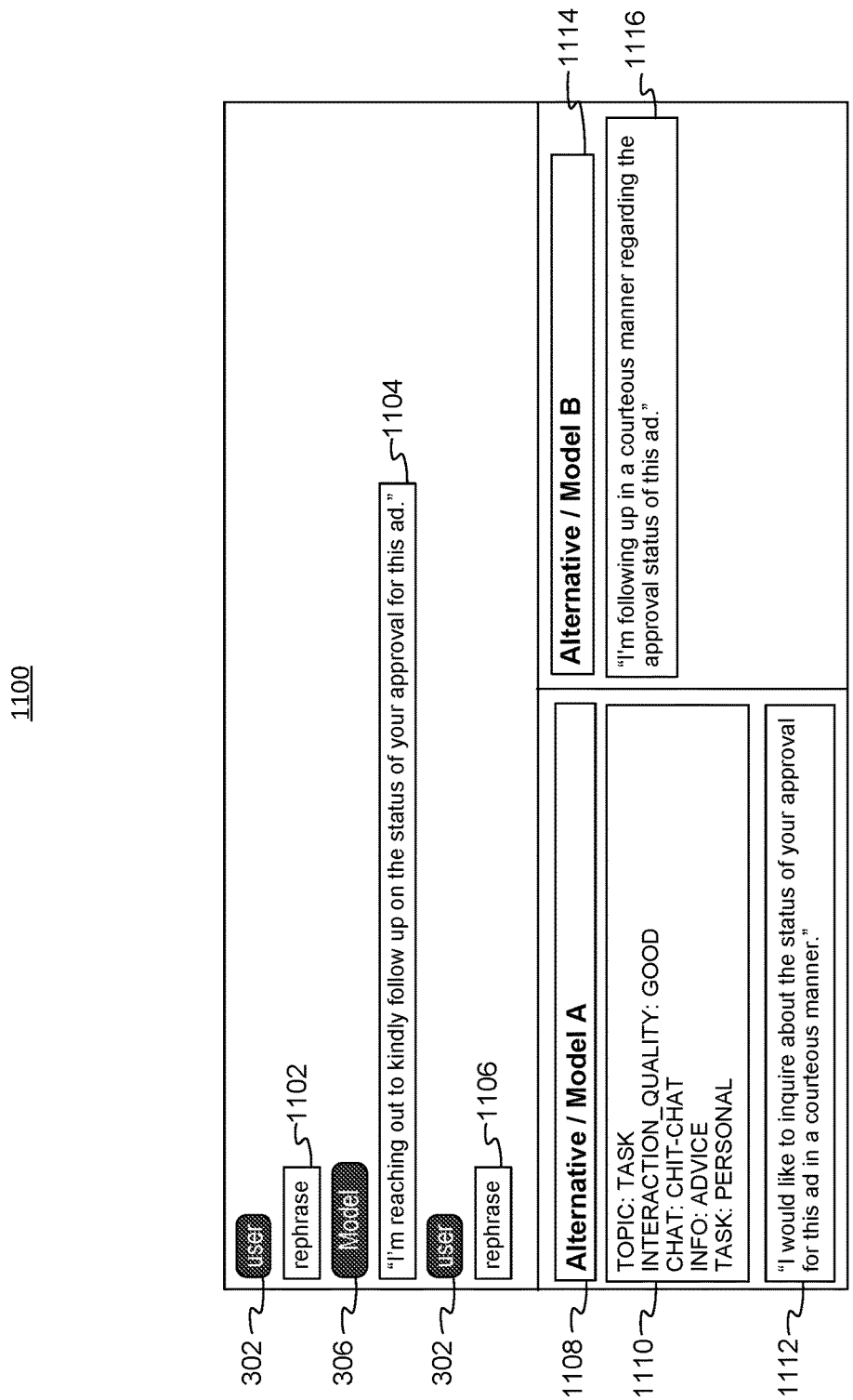
FIG. 11 is an eighth example of a graphical user interface describing interactions with a computer model according to various aspects of the present disclosure.

FIG. 11 is an eighth example of a graphical user interface (GUI) 1100 describing interactions with a computer model according to various aspects of the present disclosure. GUI 1100 includes user indicator 302 and model indicator 306. GUI 1100 includes an instruction 1102 and a corresponding first targeted response 1104. GUI 1100 may also include a second user instruction 1106, first response type 1108, second response type 1114, first alternative response 1112, second alternative response 1116, and classifier 1110.

In the example of FIG. 11, the first user instruction does not include context of reference and instead provides a brief instruction. In the example, the instruction is "rephrase." In such situations, the system can interpret the context based on previous references and take the entire previous response as the context. This type of context inference and self-determination of the text to be modified allows users to quickly interact with the model with minimal input for a more efficient operation reducing computational expense. For example, when receiving the first user instruction 1102 of "rephrase," the system may infer the instruction should be applied to the immediately previous response and use the entire previous response as the reference or context for the subsequent response. In such scenario the system may generate a context sub-prompt including the previous answer without the need of a user to enter the previous answer as part of the prompt to facilitate interactions with the model. First targeted response 1104 can provide a response that is based on the previous answer.

As shown in FIG. 11, a user may submit second user instruction 1106 after receiving the first targeted response 1104. In FIG. 11, second user instruction 1106 repeats first user instruction 1102. In such scenario, the system may infer that first targeted response 1104 did not satisfy the user. The system may generate a combined prompt that now includes information of the first targeted response 1104, the response preceding first user instruction 1102, and second user instruction 1106. By incorporating information of the multiple responses in the session into the generated combined prompt the system response may be efficiently tailored seeking a more accurate response to what the user desires with minimal input from the user.

In response to second user instruction 1106, a system may generate first alternative response 1112 and second alternative response 1116 to, similar as the example shown in FIG. 9, provide users different options, collect feedback faster, an minimize follow-up prompts. GUI 1100, similar to GUI 1000, also includes classifier 1110 that provides tags of information about a response to permit further user calibration to, for example, modify the Chat: chit-chat tag, to a tinkering chat.

Figure 12:
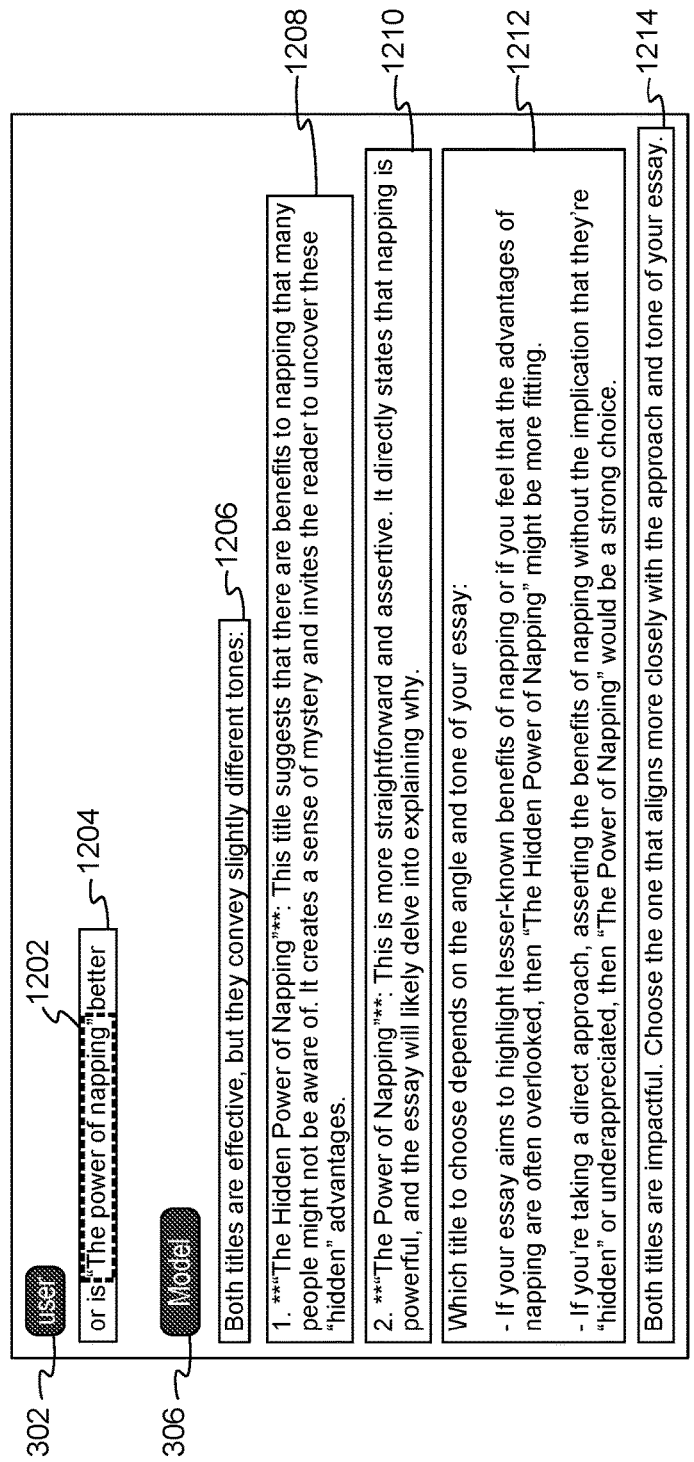
FIG. 12 is a ninth example of a graphical user interface describing interactions with a computer model according to various aspects of the present disclosure.

FIG. 12 is a ninth example of a graphical user interface (GUI) 1200 describing interactions with a computer model according to various aspects of the present disclosure. GUI 1200 includes user indicator 302 and model indicator 306. GUI 1200 includes a user instruction 1204 including a modification 1202. GUI 1200 also includes a response preamble 1206, a first alternative response 1208, a second alternative response 1210, a response explanation 1212, and a response conclusion 1214.

In the example of FIG. 12, user instruction includes a modification 1202 to a previous answer or prompt (e.g., a previous response in a session). User instruction 1204, however, asks an open question instead of a modification, in the example asking whether a phrase in modification 1202 is "better." A system may form a combined prompt that includes information from previous answers (e.g., an answer to compare an immediately previous response with other previous responses), and user instructions to evaluate different responses.

In response to such combined prompt, a system may generate a response that includes a response preamble 1206 that identifies previous responses or prompts that were compared. The response may also include first alternative response 1208 and second alternative response 1210 with different options for a user to select between the options. Response explanation 1212 may provide information about differences and potential selection considerations between first alternative response 1208 and second alternative response 1210. The model response may also include a response conclusion 1214. Further, while FIG. 12 shows the alternative responses in a GUI, embodiments where the "user" is a different computer system (e.g., a different computer system that connects or controls to a computer model in a computer using agent system as described in connection with FIG. 2) can have such client or principal computer identify the selected response within the digital environment.

In the example of FIG. 12 the targeted response is not limited to specific modifications to previous answers or prompts but may provide an analysis of previous response and guide users for response selections. This allows users to more easily interact with the computer model, with less prompts, and while maintaining a simple interaction that minimizes user input or prompting for a more effective system.

Figure 13:
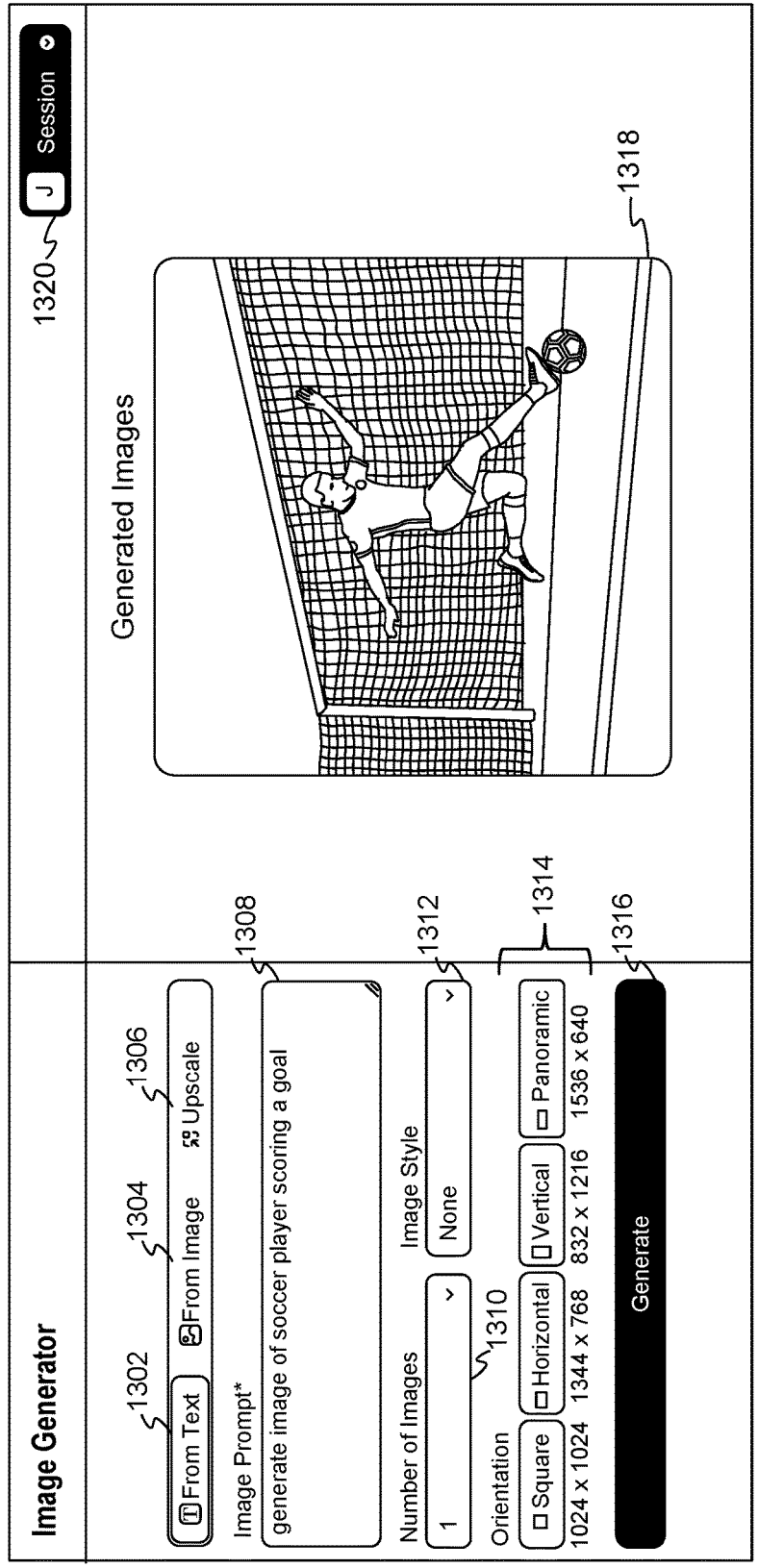
FIG. 13 is a tenth example of a graphical user interface describing interactions with a computer model according to various aspects of the present disclosure.

FIG. 13 is a tenth example of a graphical user interface (GUI) 1300 describing interactions with a computer model according to various aspects of the present disclosure. GUI 1300 may be an interface configured to generate images based on text or image inputs or prompts.

As shown in FIG. 13, GUI 1300 includes source selection icons 1302, 1304, and 1306 for source selection from text, image, or scaling. GUI 1300 also includes a prompt input 1308, a number of images selector 1310, and an image style selector 1312. GUI 1300 also includes orientation selectors 1314 and a generation button 1316. GUI 1300 may also include a generated image view 1318 and a session indicator 1320. While GUI 1300 shows elements and icons that can be used to provide instructions for image generation (e.g., orientation selectors 314), these elements are optional and in some implementations similar information can be provided on a text prompt. For example, instead of having using orientation selectors 1314, a user can indicate the targeted orientation as part of the prompt in prompt input 1308 (e.g., specifying "generate the image in landscape").

In the example of FIG. 13, a user can send an input prompt to a system via prompt input 1308 and when pressing generation button 1316. The system may then interpret the prompt (e.g., tokenize it and transmit it to a networked service via an API) and an image is generated and displayed in image view 1318.

Figure 14:
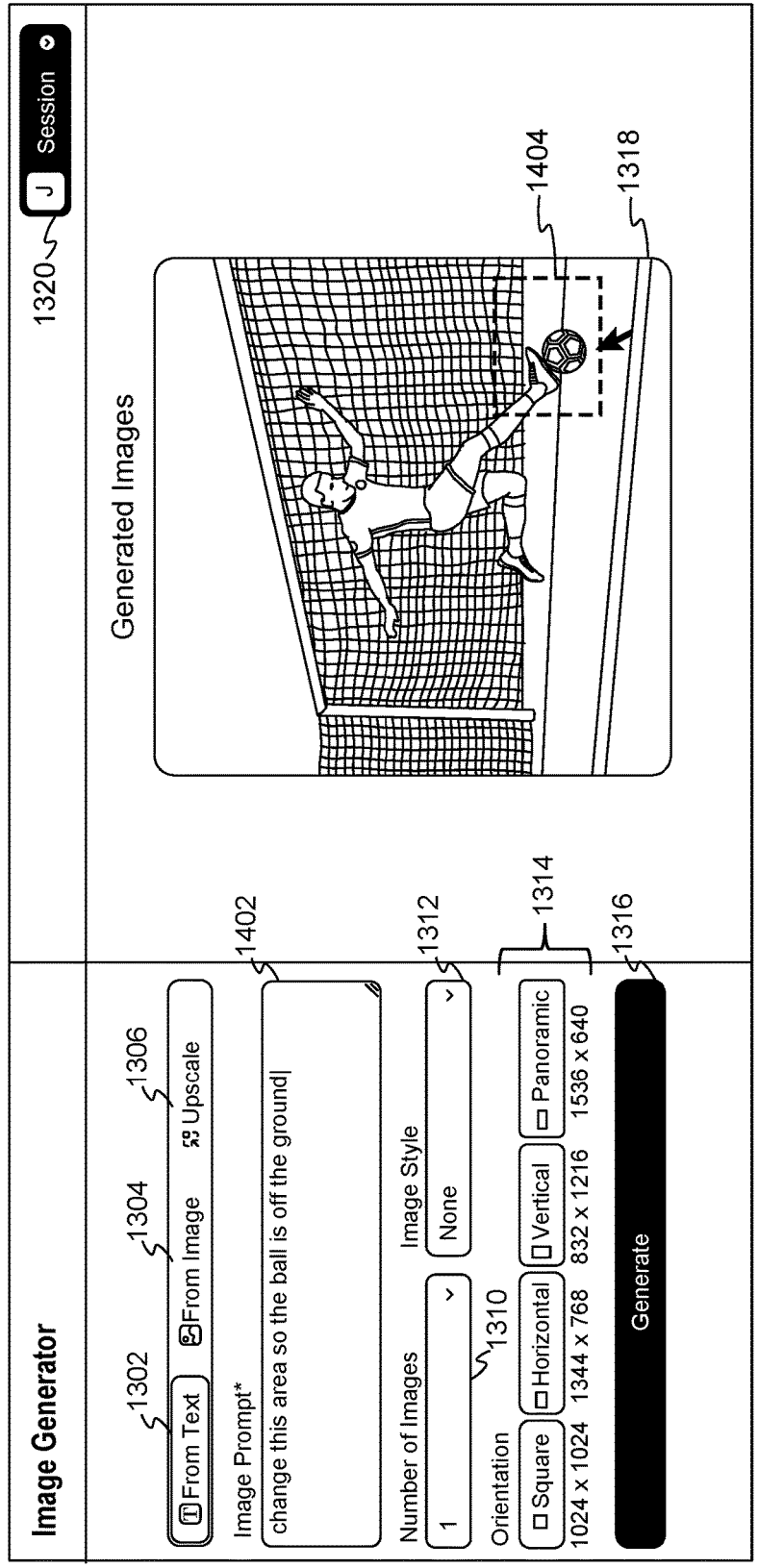
FIG. 14 is an eleventh example of a graphical user interface describing interactions with a computer model according to various aspects of the present disclosure.

FIG. 14 is an eleventh example of a graphical user interface (GUI) 1400 describing interactions with a computer model according to various aspects of the present disclosure. GUI 1400 may follow GUI 1300, that is GUI 1400 may be a GUI that follows the generation of an image based on the prompt in prompt input 1308. That is, GUI 1400 may be displayed after GUI 1300 and after a user has inputted a prompt. In other scenarios, however, GUI 1400 may be independent from GUI 1300.

GUI 1400 includes similar elements as GUI 1300 including source selection icons 1302, 1304, and 1306, images selector 1310, image style selector 1312, orientation selectors 1314, generation button 1316, generate image view 1318, and a session indicator 1320. In GUI 1400, however, a prompt input 1402 includes a different input asking for the modification of a previously generated image. As described in FIG. 14, a prompt in prompt input 1402 may ask for the modification of an image generated with an input prompt described in FIG. 13. The modification may include a reference of "this area" and a user instruction for a modification of "change . . . so the ball is off the ground." Additionally, GUI 1400 includes a selection tool 1404 that identifies a specific area in an image. Selection tool 1404 may allow users to identify, via the graphical user interface, specific sections in an image and/or image segments for modifications according to the user prompt.

A system may take the follow-up or second prompt in prompt input 1402 and the area identified by selection tool 1404 to generate a combined prompt that would permit a targeted response. For example, a system may generate a combined prompt that uses the second prompt in prompt input 1402, the selection of an area by selection tool 1404 (or a natural language description of the area in selection tool 1404), and context in interactions during the session to generate a prompt that provides a targeted reply with the modification the user specifies in the second instructions.

Using graphical tools facilitate the formation of prompts for targeted replies and improve the ability of users to efficiently interact with computer models. For example, instead of having to come-up with a new prompt with a specific modification. In the example of FIGS. 13 and 14, instead of re-writing the prompt to specify a ball not touching the ground (e.g., "generate image of score player scoring a goal and with the ball not touching the ground") a user can simply send a user instruction and a reference of "this area" to have a targeted modification of the previous response. The ability to direct the model attention to a specific area and a targeted modification makes it easier for users to interact with computer models and also permit the generation of responses faster and with less computational resources by automatically generating tailored prompts with specific modifications that allows a model to reuse most of a generated image and perform tailored modifications. In the disclosed systems such faster interaction can be achieved by leveraging the previous response. For example, as shown in FIG. 13 a first prompt can include instructions to generate at least one of an image. The system can then output the first response (e.g., a generated image). Such image generation may use an image or video generation model that is interfaced with an API. For example, the system may engage with networked services (e.g., networked services 217) associated with an image generation service and can receive and transmit data through an API. The response to the first query then includes at least one of an image or a video and the user can seek modifications with a second prompt include reference to a segment of the generated image (e.g., identified with selection tool 1404). The combined prompt with a video response can be generated by generating a natural language description of the segment using the computer model and including the natural language description in the context sub-prompt.

Figure 15:
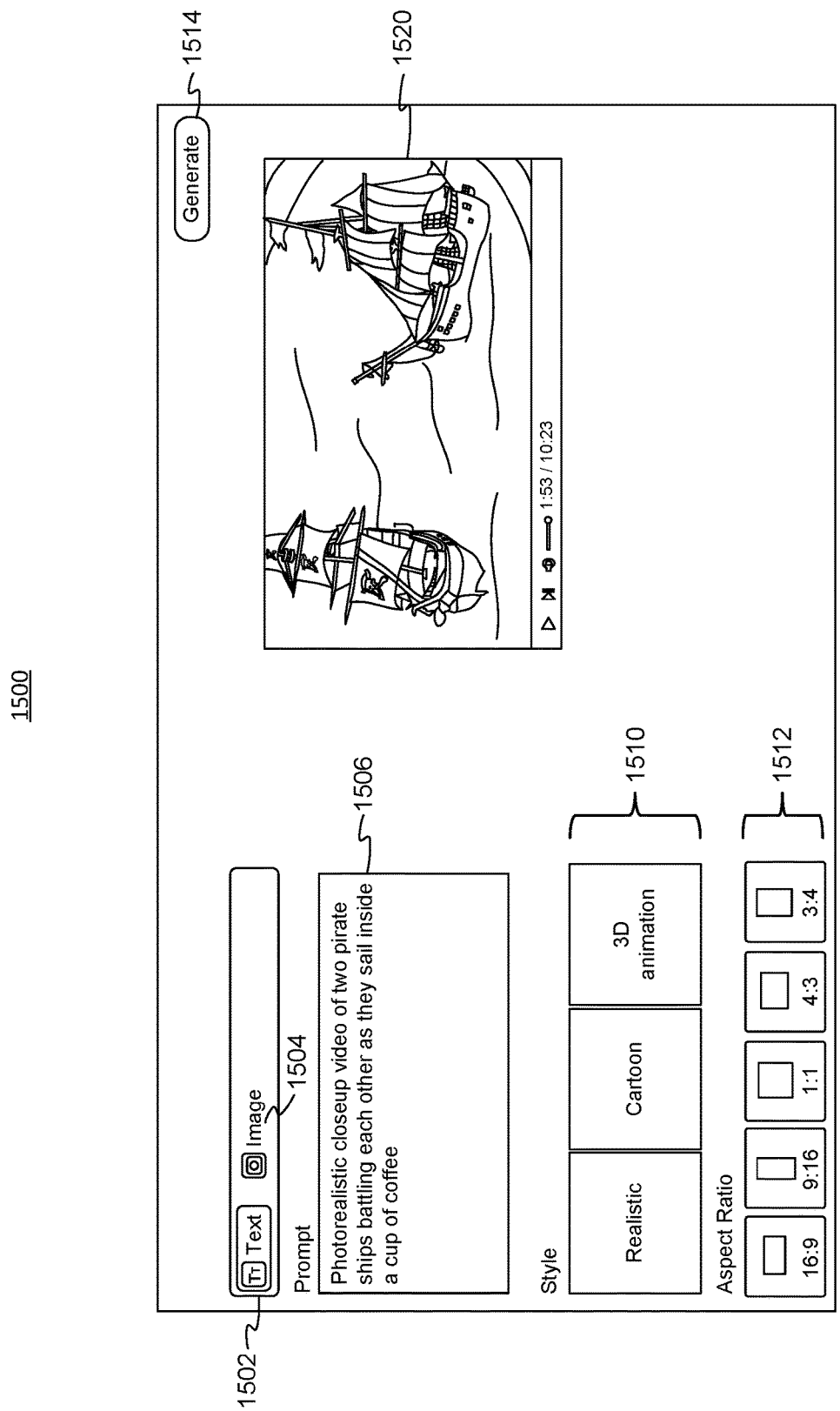
FIG. 15 is a twelfth example of a graphical user interface describing interactions with a computer model according to various aspects of the present disclosure.

FIG. 15 is a twelfth example of a graphical user interface (GUI) 1500 describing interactions with a computer model according to various aspects of the present disclosure. GUI 1500 may be an interface configured to generate video based on text or image inputs or prompts.

GUI 1500 includes source selectors 1502 and 1504, for selecting between text and image input prompts. GUI 1500 also include a prompt input 1506 and a style selector 1510. GUI 1500 also includes an aspect ratio selector 1512 and a generate button 1514. GUI 1500 may also include a generated video viewer 1520. As shown in FIG. 15, generated video viewer 1520 may include playback functions and segment selection. While GUI 1500 shows elements and icons that can be used to provide instructions for image generation (e.g., aspect ratio selector 1512), these elements are optional and in some implementations similar information can be provided on a text prompt. For example, instead of having aspect ratio selector 1512, a user can indicate the targeted aspect ratio as part of the prompt in prompt input 1506 (e.g., specifying "generate the vide having an aspect ratio of 3:4").

In the example of FIG. 15, a user can send an input prompt to a system via prompt input 1506 and when pressing generate button 1514 the system may interpret the prompt (e.g., tokenize it and transmit it to a networked service via an API) to generate a video that is displayed in video viewer 1520.

Figure 16:
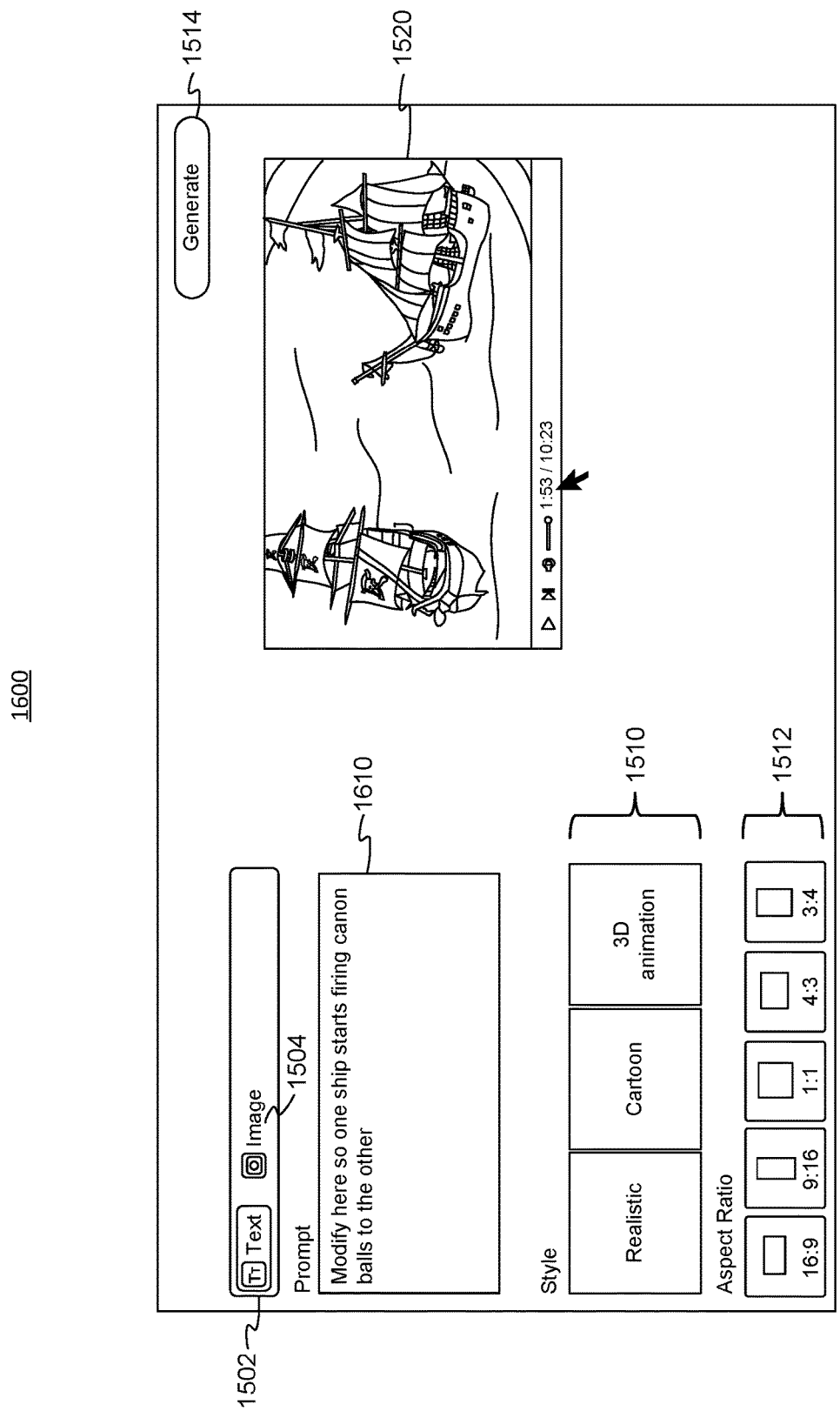
FIG. 16 is a thirteenth example of a graphical user interface describing interactions with a computer model according to various aspects of the present disclosure.

FIG. 16 is a thirteenth example of a graphical user interface (GUI) 1600 describing interactions with a computer model according to various aspects of the present disclosure. GUI 1600 may follow GUI 1500. That is, GUI 1600 may be displayed after GUI 1500 and after a user has inputted a prompt. In other scenarios, however, GUI 1600 may be independent from GUI 1500.

GUI 1600 includes similar elements as GUI 1500 but additional includes a second prompt entered in prompt input 1610. The second prompt seeks modification of the previous response by including a reference to the previous response and a user instruction. In the example of FIG. 16, the second or follow up from asks for a modification "here" (e.g., at the time stamp or the specific time frame displayed in video viewer 1520) and a modification of "starts firing canon balls." In such implementations, the system may be configured to generate a combined prompt including a reference sub-prompt that identifies the video segment or portion identified in the prompt entered in 1610, a reference to the previous response (e.g., a description of the video generated in the previous response). For example, the system may generate a prompt in which the instructions for the video generator is "take the video you created in the previous response using prompt of [photorealistic closeup video of two pirate ships battling each other as they sail inside a cup of coffee] and at 1:02 have one of the ships fire canons to the other for 10 seconds." Such combined prompt would permit generating targeted replies in a multi-modal system with simpler prompting that leverages the GUI, previous responses, for more accurate responses with less required prompting and less iterations.

Figure 17:
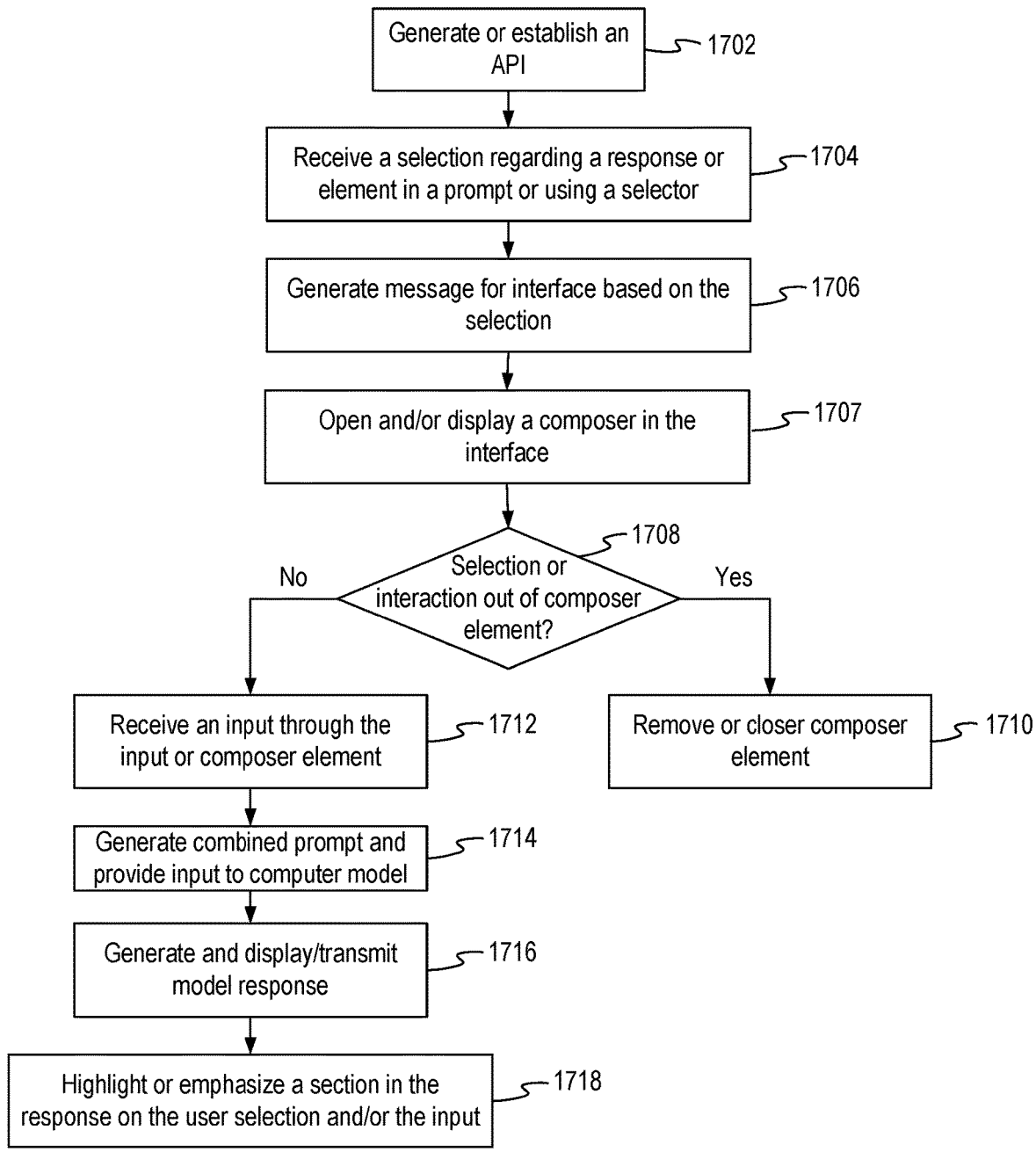
FIG. 17 is a flow chart of a first example of a process for prompting a computer model for targeted interactions according to various aspects of the present disclosure.

FIG. 17 is a flow chart of a first example of a process 1700 for prompting a computer model for targeted interactions according to various aspects of the present disclosure. Process 1700 may be executed by one or more processors. For example, process 1700 may be executed by elements in system 100 (such as predictive output generation engine 140). Alternatively, or additionally, process 1700 may be executed by elements in system 200. For example, some steps in process 1700 may be executed by a combination of request handler 210, interface 204, and terminal 202. Alternatively, or additionally, some steps of process 1700 may be performed by input engine 110, while other steps may be performed by modeling engine 130. The description below describes process 1700 as performed by a processor but additional elements, like databases, engines, or devices, may perform one or more of the steps in process 1700.

In step 1702, a processor may generate an interface. For example, a processor may display one of the graphical user interfaces as disclosed in connection with FIGS. 3-16. Alternatively, or additionally, a processor can establish communication with a system using an API in step 1702.

In step 1704, a processor may receive a selection, such as from a user or a computer controlling the system (e.g., via a GUI) or a computer system (e.g., via an API from a client/principal in scenarios of a computer using the model as an agent), regarding a response or element in the interface. For example, in step 1704 a user may select a portion of a response generated by the machine learning model using a cursor. As another example, in step 1704 a computer system may identify a portion of a response or select a portion of a GUI during a computer using agent interaction.

In step 1706, a processor may generate message that is transmitted via the interface of step 1702 based on the selection. For example, as discussed in connection with FIG. 5, a processor may display a box that highlights the user selection and includes an input box for further instructions. As another example, a processor may generate a message for a principal computer specifying information that was selected in step 1704.

In step 1707, a processor may open and/or display a composer via the interface. For example, a composer to receive user input may be displayed in the interface of step 1702 to include user input options as those described in connection with FIGS. 5 and 7. As another example, a processor may establish composer API ports for interactions with other computer systems.

In step 1708, a processor may determine if there is interaction with the composer of step 1707. For example, a processor may determine if a user or a principal computer clicked out of the composer or if the user selected the composer within a set time interval. Alternatively, a processor may determine if a user or principal computer is using a different port in the API connection. If in step 1708 a processor determines that a user is not interacting with the composer, for example a user selected an element out of the composer (step 1708: Yes) process 1700 may continue to step 1710. In step 1710, a processor may remove or close the composer element. For example, a processor may display a standard GUI (e.g., a previous GUI without the composer). As another example, in step 1710, the composer element shown in FIG. 5 may get removed to show the standard conversation box for interaction with the machine learning model. However, if in step 1708 a processor determines that a user is interacting with the composer, for example a user selected the composer and introduced an input (step 1708: No) process 1700 may continue to step 1712.

In step 1712, a processor may receive an input through the input element or option in the composer. For example, as shown in FIG. 5, a user may include an additional instruction in the composer that is related to the user selection.

In step 1714, a processor may generate a prompt that combines the instructions received in step 1712 with the user selection to generate a prompt that is made to receive a tailored response from the machine learning model. For example, as discussed in connection with FIG. 6, a processor may generate a prompt that combines the user selection and the context of the conversation to create a prompt. The processor may further provide the prompt or input to a computer model to generate a response.

In step 1716, a processor may generate and display or transmit a model response to the prompt or input from step 1714. For example, a processor may input to an LM, the prompt generated in step 1714 to get a new response. In some systems, generating and displaying the model response may involve: determining the user pressed enter or selected a button in the user interface (e.g., the generate button 1514). In some systems, the system may also determine whether the user has interacted with a previous response (e.g., highlighting or selecting a part or segment of the response). And when the user graphically interacts with the previous response, the system may pass information to the model to generate a new response (e.g., providing a natural language description of a portion of the response). Additionally, or alternatively, generating a response may include generating a prompt, such as a "reply to this part", only available for the last response. In such embodiments, the response may be based on the last line of the response.

In step 1718, a processor may generate a message or display a GUI including the response. As discussed in connection with FIG. 7, in some embodiments the GUI in step 1718 may include highlights to the portion of the user selection. Additionally, the GUI may include a message box that includes the user selection.

Process 1700 may allow faster interactions with shorter and/or more directed prompts for targeted replies. For example, the system may use the interface to guide and allow users (including client computer systems or computers using the system as an agent) to provide more specific information for targeted prompts. For example, using the interface, the system can output a first response. A user then can input a second user prompt with a user selection of an element in the first response displayed in the graphical interface (e.g., highlighting a portion of a previous response or a user selection emphasizing with a cursor a portion of the graphical user interface, as discussed in FIG. 14), displaying a message on the graphical interface based on the user selection (e.g., to give some feedback to the user of what is selected); displaying a composer on the graphical user interface with an input option for the user to enter instructions; and receiving the second user prompt through the input option. This graphical interaction allows for a guided and simpler interaction and, for example, outputting the second response can include displaying the second response while emphasizing a portion of the second response based on the user selection.

The process can also minimize resource expenditure by removing certain elements in the interface that are not being used and by displaying messages to provide feedback to users about the information used for sub-prompts when forming the combined prompt in targeted responses. For example, the system may determine whether a user interacts with the composer and in response to determining that a user has not interacted with the composer after a time interval, removing the composer from the graphical user interface. Additionally, the system may be configured to, after receiving the second user prompt, display a message box in the graphical interface. The message box can include the user selection and the second response to provide a more natural environment to generate an additional, more targeted, response.

Figure 18:
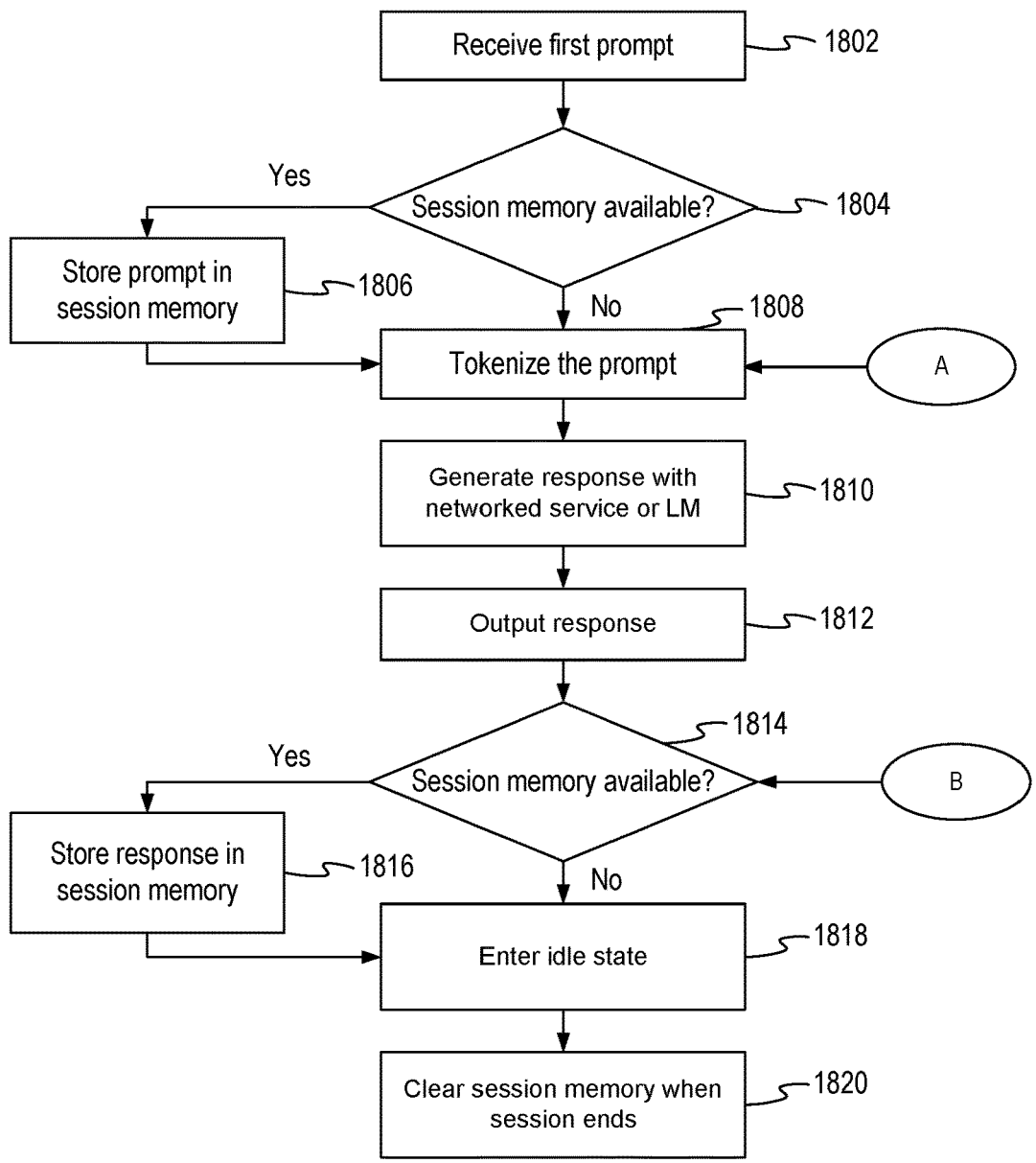
FIG. 18 is a flow chart of a second example of a process for prompting a computer model for targeted interactions according to various aspects of the present disclosure.

FIG. 18 is a flow chart of a second example of a process 1800 for prompting a computer model for targeted interactions according to various aspects of the present disclosure. Process 1800 may be executed by one or more processors. For example, process 1800 may be executed by elements in system 100 (such as predictive output generation engine 140). Alternatively, or additionally, process 1800 may be executed by elements in system 200. Some steps in process 1800 may be executed by a combination of request handler 210, interface 204, and/or terminal 202. Alternatively, or additionally, some steps of process 1800 may be performed by input engine 110, while other steps may be performed by modeling engine 130. The description below describes process 1800 as performed by a processor but additional elements, like databases, engines, or devices, may perform one or more of the steps in process 1800.

In step 1802, a processor may receive a first prompt. First prompt in step 1802 may be received through an interface (such as interface 204) once a user inputs or a client computer system generates a first prompt or instruction, such as is described in FIGS. 2-5, 10, 13, and 15. A user may input the new prompt via a GUI, or a client computer system (i.e., a computer system that uses the computer model as an agent in a computer using agent configuration) transmits a new prompt or request via an interface.

In step 1804, a processor may determine whether a session memory is available. For example, a request handler (such as request handler 210) may determine whether a user or client has opted out from having a session memory in the user's conversations or requests. Additionally, a processor may determine if the session has temporary memory resources available (e.g., based on subscription model and/or system usage). If the processor determines that a session memory is available (step 1804: Yes) the processor may continue to step 1806 and store the prompt received in step 1802 in session memory. Alternatively, in some situations in step 1806 the processor may store the prompt received in step 1802 in client memory. However, if the processor determines that a session memory is not available (step 1804: No) the processor may continue to step 1808 without storing in session memory.

In step 1808, a processor may tokenize the prompt. For example, a processor may break down a first prompt into tokens representing words, subwords, or individual characters. For this process, the processor may analyze the first prompt, splitting it into basic components like words and punctuation marks, and then map each of these components to numerical values from a pre-built vocabulary that computer models were trained on. As part of step 1808 if processor does not identify a word or phrase in a database or vocabulary, the processor may break down the word or phrase further into smaller subword tokens.

In step 1810, a processor may generate a response with networked services or LM (e.g., networked services 217 or language model 219). For example, a request handler may communicate the first prompt to a networked service (such as one of networked services 217) via an API or to an LM (such as language model 219) via a web interface seeking a response for the first prompt. In step 1810 the process may generate a response considering both output token and context window limits. The processor may, for example, limit the tokens that are generated by a model in response to the prompt. Depending on the model selected for generation (e.g., the model identified in request handler 210), the model may have different limits for output tokens, and different context windows describing the total tokens that can be used for both input tokens and output tokens (and for some models, reasoning tokens). The processor may be configured to identify prompts, or combined prompts, that can exceed allocated context windows for a model, which might result in truncated outputs and modifying prompts to adjust to system requirements.

In step 1812, a processor may output a response. For example, as further discussed in connection with FIG. 2, request handler 210 may compose a response based on information generated by the LM or networked services based on the first prompt to generate a response. And in step 1812, the processor may output or transmit the generated response (e.g., by sending a response to be displayed in terminal 202 via interface 204 or by transmitting it to a principal or client computer system that uses system 200 as an agent).

In step 1814, processor may determine if session memory is available. Similar to the operations in step 1804, a processor may determine if a session memory has been opted out of and/or determine if there are enough resources in the session. If the processor determines that session memory is available (step 1814: Yes), the processor may continue to step 1816 and store the response in the session memory. Alternatively, in some situations in step 1816 the processor may store the response in a client memory. However, if the processor determines that the session memory (or client memory) is not available, the processor may continue to step 1818 and enter an idle state. In the idle state, the system is not actively processing any input or generating any responses. The idle state may be configured to be of lower resource consumption because the system is not performing computations or engaging its neural networks, conserving computational resources. However, the system can remain available to be activated with new user prompts, and the surrounding infrastructure, such as the server or an API handling interactions, continues to run in the background, maintaining connectivity and readiness, while having the LM inactive until triggered by input.

In step 1820, the processor may clear session memory when the session ends, as further described in connection with FIG. 2. For example, when a user closes, logs-off, or deletes a session or conversation, a processor may delete the session memory to preserve resources and maintain privacy.

Figure 19:
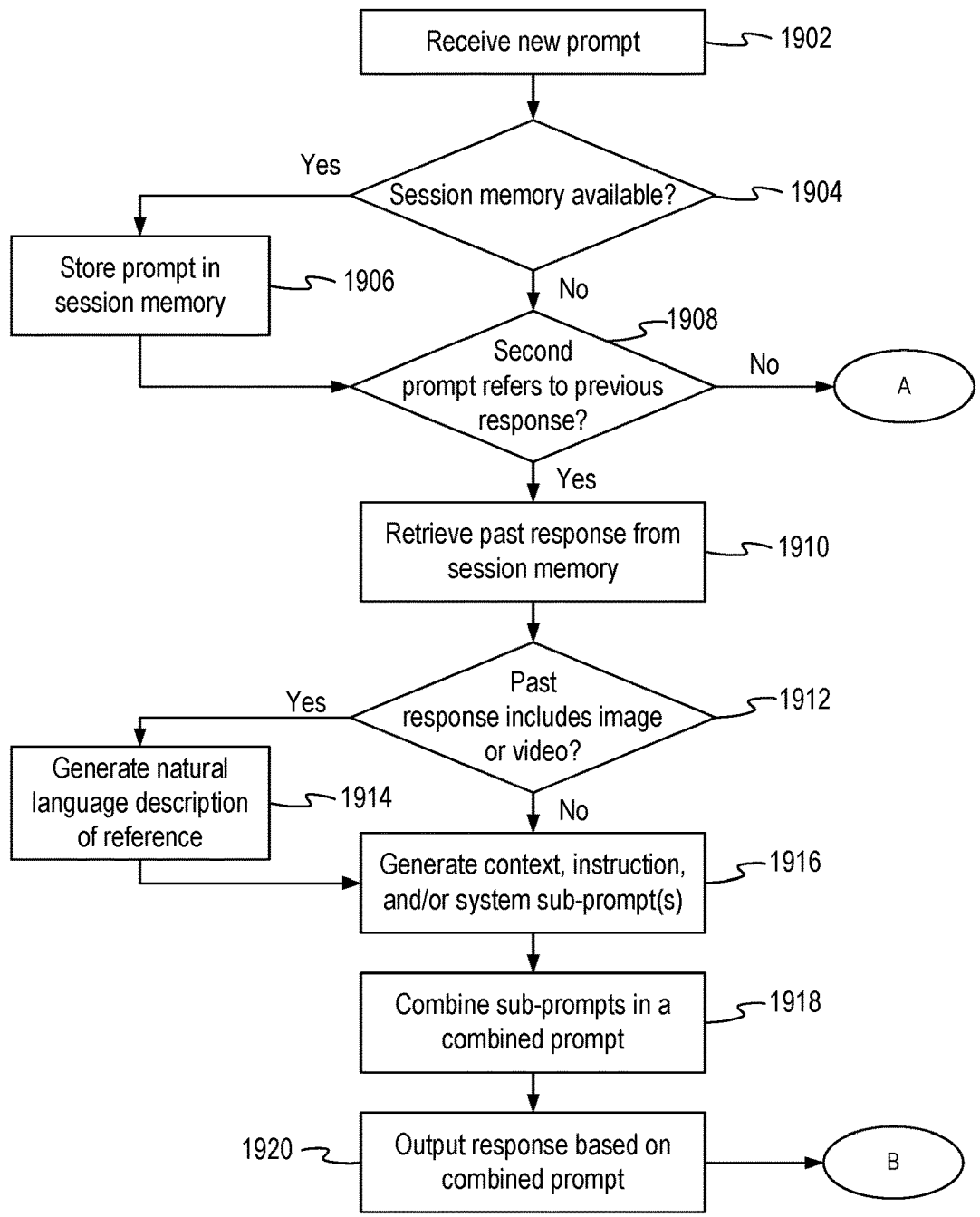
FIG. 19 is a flow chart of a third example of a process for prompting a computer model for targeted interactions according to various aspects of the present disclosure.

FIG. 19 is a flow chart of a third example of a process 1900 for prompting a computer model for targeted interactions according to various aspects of the present disclosure. For example, process 1900 may be executed by elements in system 100 (such as predictive output generation engine 140). Alternatively, or additionally, process 1900 may be executed by elements in system 200. For example, some steps in process 1900 may be executed by a combination of request handler 210, interface 204, and terminal 202. Alternatively, or additionally, some steps of process 1900 may be performed by input engine 110, while other steps may be performed by modeling engine 130. The description below describes process 1900 as performed by a processor but additional elements, like databases, engines, or devices, may perform one or more of the steps in process 1900. Process 1900 may be performed after process 1800. For example, step 1902 in process 1900 may be performed after step 1812 in process 1800. But process 1900 and process 1800 may be also independent.

In step 1902, a processor may receive a new prompt. For example, as discussed in connection with FIGS. 7, 8, 9, 10, 12, 14, and 16, a user or a client computer system may submit a second prompt that seeks modification of a previous answer or requests a response based on a previous answer. A user or a computer controlling the system may input the new prompt via a GUI, or a client/principal computer system (i.e., a computer system that uses the computer model as an agent in a computer using agent configuration) transmits a new prompt or request via an interface, or generates an instruction to interact with the agent system.

In step 1904, a processor may determine whether the session memory is available. If the session memory is available (step 1904: Yes), the processor may store the new prompt from step 1902 in session memory. However, if the processor determines that the session memory is not available (step 1904: No), the processor may continue to step 1908.

In step 1908, a processor may determine if the second or new prompt refers to a previous response. For example, a processor may determine whether the second or new prompt includes a reference to a previous response by comparing the prompt with information stored in the session memory. If the processor determines that the second or new prompt does not refer to a previous response (step 1908: No), the processor may go to connector A and go to step 1808 in process 1800 (FIG. 18) continuing the prompt resolution (e.g., tokenizing the prompt). However, if the processor determines that the second or new prompt does refer to a previous response (step 1908: Yes) the processor may continue to step 1910.

In step 1910, a processor may retrieve or identify a past response from session memory. For example, when the new prompt in step 1902 includes a reference to a previous answer (e.g., "change the last sentence"), in step 1910 a processor may query session memory (e.g., session memory 215) to identify the last sentence in the last answer. In some embodiments, the processor may retrieve the past response by comparing specific phrases or characters in the user request (e.g., the second prompt) with information in the session memory.

In step 1912, a processor may determine whether the past response includes an image or a video. For example, as discussed in connection with FIGS. 13-16, some of the systems can support targeted replies for video and image generation. In step 1912, a processor may determine if a past response identified in step 1910 is associated with generation of video or image. If the processor determines the past response includes image or video (step 1912: Yes), the processor may continue to step 1914 and generate a natural language description of the reference to be included in the text input. For example, in the example of FIG. 14, the selection tool 1404 focuses on the soccer ball. In step 1914, a processor may generate a natural language description of the reference for a text input, such as "the user highlighted the area of the image in which the soccer ball is touching the ground of the image." This type of natural language description of the reference can facilitate the generation of the combined prompt for targeted replies using video or image generation. However, if the processor determines that the past response does not include an image or video (step 1912: No), the processor may continue to step 1916.

In step 1916, a processor may generate sub-prompts such as context, instructions, and/or system sub-prompts as discussed above in connection with FIGS. 6-16. For example, as further discussed in connection with FIG. 6, a processor may identify sub-prompts that capture context for a targeted prompt (e.g., based on the new input in step 1902 and information in session memory), user instructions (e.g., based on modifications or alterations requested in the user prompt), and system instructions (e.g., instructions regarding tone or depth information in a client and/or permanent memory). In step 1916, the processor may process the prompt to generate sub-prompts and/or instructions for generating a prompt that results in a targeted reply.

In step 1918, a processor may generate a combined prompt by combining sub-prompts in the combined sub prompt. For example, as discussed in connection with FIG. 6, a processor may generate a combined prompt that includes context, user instruction, and system instruction information in a prompt that is generated by the system with minimal or basic user interaction. The combined prompt in step 1918 may include information that permits a computer model to provide a targeted response to a user query by providing sufficient context and specific instructions. Employing such a method can solve technical issues that cause model inefficiencies, require additional prompting, and/or result in high computation expenditures.

In step 1920, a processor may output a response based on the combined prompt. For example, a request handler (e.g., request handler 210) may receive a response from an LM model based on the combined prompt of step 1918, and the request handler may compose a response that uses the LM input or networked service input and formats according to terminal or user preferences and/or according to transmission requirements of a client computer system. This response can then be transmitted through an interface to a user and/or the client computer system that generated the request.

When performing process 1900, a processor may also go to connector B and perform operations of 1814 to 1820 in process 1800. For example, after outputting a response in step 1920, a processor may determine if session memory is available in step 1814 of processor 1800 and continue with processes to store a response in 1816 and enter an idle state in step 1818.

Processes 1700, 1800, and 1900 may be performed in combination to form a system that can more efficiently resolve queries. For example, in some implementations the system may be configured to receive a first prompt through an interface and store the first prompt in a session memory (e.g., session memory 215). The system may then process the first prompt and output a first response using the computer model (e.g., using a natural language, an image, or a video generation model). Then, the system can receive a second prompt or query that asks to perform an instruction (e.g., a user instruction to make a modification) with reference to a segment of the first response. And the system may be configured to, in response to receiving the second prompt, generate the combined prompt by: retrieving the segment from the session memory and generating a context sub-prompt including the segment, generating an instruction sub-prompt including the user instruction, and combining the context sub-prompt with the instruction sub-prompt in the combined prompt. The system may then output a second response to the combined prompt using the computer model and formatting the response, so it is transmitted and/or displayed as responding to the second prompt. The system can transmit the second response to a user (e.g., by displaying it to a GUI). The system can also transmit the second response to a client computer system in a computer using agent scenario, where the computer model acts as an agent responding to requests from the client computer system.

In processes 1700, 1800, and 1900 the processes may include combined operations to improve the system performance. For example, outputting a follow-up or second response may include tokenizing the combined prompt and generating the follow-up or second response using a computer model (e.g., an LM) based on a tokenized combined prompt.

The processes may also include follow-up operations. While processes 1700, 1800, and 1900 describe generally two interactions, more interactions are possible. For example, after generating the follow-up or second response, the system may prepare for further prompts or interactions (or a sequence of prompts and interactions) and store the second or follow-up response in the session memory. The system may receive a third prompt (or a response to the follow-up response) through the interface. The third prompt may include a reference to the second response and a second user instruction. And the system may be configured to, in response to receiving the third prompt, generate a new combined prompt. As discussed above, the combined prompt can include a context sub-prompt and a user instruction sub-prompt. As part of the sequence the new combined sub-prompt may include additional information for further targeting the response. For example, the context sub-prompt in a new interaction may include a segment of the second response and a segment of the first response, and the instruction sub-prompt can specify further modification and/or interactions that can be more tailored to the user request.

As discussed above, the combined prompt in processes 1700, 1800, and 1900 can also include information from a permanent memory. For example, in some systems, a processor can be configured to retrieve system instructions from a client and/or permanent memory associated with an active session. System instructions can be predefined guidelines that control a language model behavior and operate in the background to ensure the model delivers appropriate responses complying with task-specific requirements. Based on the system instructions, the system can generate a system sub-prompt based on the system instructions and combine context, instruction, and the system sub-prompts in the combined prompt.

Processes 1700, 1800, and 1900 may also include processes with steps that permit the generation of more targeted responses. For example, the process can have a system for receiving a prompt with a reference to a past response and a user instruction. The system may then identify in session memory, a past prompt associated with the past response by comparing the reference with prompts stored in the session memory; retrieving a segment of the past prompt; and generating a context sub-prompt with the retrieved segment. This context sub-prompt can be used in a combined prompt along with a user instruction sub-prompt; and a combined prompt combining the context sub-prompt and the instruction sub-prompt. The combined prompt can then generate a new response to the combined prompt using the language model and outputting the new response via the interface as responding to the prompt.

The processes 1700, 1800, and 1900 can also make it possible to efficiently resolve additional prompts for further targeted responses. For example, in the processes, the system may be configured to receive a continuation user prompt through the interface. The continuation user prompt may refer to the response generated from a previous prompt and include a continuation user instruction (e.g., the continuation user prompt may ask for further edits in a response, as in the examples of FIGS. 7 and 10). The system may be configured to, in response to receiving the continuation user prompt, generate a second combined prompt with second context sub-prompt (having a segment of the new response and a segment of the past response) and a second instruction sub-prompt (based on the continuation user instruction).

FIG. 20 is a block diagram illustrating an example operating environment for implementing various aspects of this disclosure, according to some of the disclosed methods and systems of the present disclosure. An example operating environment for implementing various aspects of this disclosure is illustrated in FIG. 20.

As illustrated in FIG. 20, an example operating environment 2000 may include a computing device 2002 (e.g., a general-purpose computing device) in the form of a computer. Components of the computing device 2002 may include, but are not limited to, various hardware components, such as one or more processors 2006, data storage 2008, a system memory 2004, other hardware 2010, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 20, an operating environment 2000 for an example method or system includes at least one computing device 2002. The computing device 2002 may be a uniprocessor or multiprocessor computing device. An operating environment 2000 may include one or more computing devices (e.g., multiple computing devices 2002) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 2002 may be configured for end-users, e.g., with applications, for administrators, as a server, as a distributed processing node, as a special-purpose processing device, or otherwise configured to train machine learning models and/or use machine learning models.

One or more users may interact with the computer system including one or more computing devices 2002 by using a display, keyboard, mouse, microphone, touchpad, camera, sensor (e.g., touch sensor) and other input/output devices 2018, via typed text, touch, voice, movement, computer vision, gestures, and/or other forms of input/output. An input/output 2018 may be removable (e.g., a connectable mouse or keyboard) or may be an integral part of the computing device 2002 (e.g., a touchscreen, a built-in microphone). A user interface 2012 may support interaction between a method and system and one or more users. A user interface 2012 may include one or more of a command line interface, a graphical user interface (GUI), natural user interface (NUI), voice command interface, and/or other user interface (UI) presentations, which may be presented as distinct options or may be integrated.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printers, which may be connected through an output peripheral interface or the like.

One or more application programming interface (API) calls may be made between input/output devices 2018 and computing device 2002, based on input received from at user interface 2012 and/or from network(s) 2016. As used throughout, "based on" may refer to being established or founded upon a use of, changed by, influenced by, caused by, or otherwise derived from. In some of the disclosed methods and systems, an API call may be configured for a particular API and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some of the disclosed methods and systems and part of a system including one or more computing devices 2002 in other systems or methods, depending on their detachability from the processor(s) 2006. Other computerized devices and/or systems not shown in FIG. 20 may interact in technological ways with computing device 2002 or with another system using one or more connections to a network 2016 via a network interface 2014, which may include network interface equipment, such as a physical network interface controller (NIC) or a virtual network interface (VIF).

Computing device 2002 includes at least one logical processor 2006. The at least one logical processor 2006 may include circuitry and transistors configured to execute instructions from memory (e.g., memory 2004). For example, the at least one logical processor 2006 may include one or more central processing units (CPUs), arithmetic logic units (ALUs), Floating Point Units (FPUs), and/or Graphics Processing Units (GPUs). The computing device 2002, like other suitable devices, also includes one or more computer-readable storage media, which may include, but are not limited to, memory 2004 and data storage 2008. In some of the disclosed methods and systems, memory 2004 and data storage 2008 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 2020 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 2002, making its content accessible for interaction with and use by processor(s) 2006. The removable configured medium 2020 is an example of a computer-readable storage medium. Some other examples of computer-readable storage media include built-in random-access memory (RAM), read-only memory (ROM), hard disks, and other memory storage devices which are not readily removable by users (e.g., memory 2004).

The configured medium 2020 may be configured with instructions (e.g., binary instructions) that are executable by a processor 2006; "executable" is used in a broad sense herein to include machine code, interpretable code, byte-code, compiled code, and/or any other code that is configured to run on a machine, including a physical machine or a virtualized computing instance (e.g., a virtual machine or a container). The configured medium 2020 may also be configured with data which is created by, modified by, referenced by, and/or otherwise used for technical effect by execution of the instructions. The instructions and the data may be configure the memory or other storage medium in which they reside; such that when that memory or other computer-readable storage medium is a functional part of a given computing device, the instructions and data may also configure that computing device.

Although a system or method may be described as being implemented as software instructions executed by one or more processors in a computing device (e.g., general-purpose computer, server, or cluster), such description is not meant to exhaust all possible methods or systems. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, a method or system may include other hardware logic components 2010 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of a method or system may be grouped into interacting functional modules based on their inputs, outputs, and/or their technical effects, for example.

In addition to processor(s) 2006, memory 2004, data storage 2008, and screens/displays, an operating environment 2000 may also include other hardware 2010, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some method or system, other input/output devices 2018 such as human user input/output devices (screen, keyboard, mouse, tablet, microphone, speaker, motion sensor, etc.) will be present in operable communication with one or more processors 2006 and memory.

In some of the disclosed methods and systems, the system includes multiple computing devices 2002 connected by network(s) 2016. Networking interface equipment can provide access to network(s) 2016, using components (which may be part of a network interface 2014) such as a packet-switched network interface card, a wireless transceiver, or a telephone network interface, for example, which may be present in a given computer system. However, a system or method may also communicate technical data and/or technical instructions through direct memory access, removable non-volatile media, or other information storage-retrieval and/or transmission approaches.

The computing device 2002 may operate in a networked or cloud-computing environment using logical connections to one or more remote devices (e.g., using network(s) 2016), such as a remote computer (e.g., another computing device 2002). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 2002 may be connected to a public or private network through a network interface or adapter. In some of the disclosed methods and systems, a modem or other communication connection device may be used for establishing communications over the network. The modem, which may be internal or external, may be connected to the system bus via a network interface or other appropriate mechanism. A wireless networking component such as one including an interface and antenna may be coupled through a suitable device such as an access point or peer computer to a network. In a networked environment, program modules depicted relative to the computer, or portions thereof, may be stored in the remote memory storage device. It may be appreciated that the network connections shown are example and other means of establishing a communications link between the computers may be used.

Computing device 2002 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media.

Computer-readable media may be embodied as a computer program product, such as software (e.g., including program modules) stored on non-transitory computer-readable storage media.

The data storage 2008 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 2008 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like.

In some systems, environment 2000 may be configured for targeted interactions with a machine learning model. The system may include a memory (e.g., memory 2004) storing instructions and a processor (e.g., processor 2006) configured to execute the instructions to perform operations. The operations may include displaying a graphical user interface; receiving a user selection of an element displayed in the graphical user interface; displaying a message on the graphical user interface based on the user selection; displaying a composer on the graphical user interface, the composer including an input option; receiving an instruction through the input option. The operations may also include generating a prompt for the machine learning model by combining the user selection and the instruction; providing the prompt to the machine learning model; and generating a response to the prompt and displaying the response in the graphical user interface.

In some systems, environment 2000 may be configured to perform a method for targeted interactions with a machine learning model. The method may include steps, processes, or operations for displaying a graphical user interface; receiving a user selection of an element displayed in the graphical user interface; and displaying a message on the graphical user interface based on the user selection. The method may also include displaying a composer on the graphical user interface, the composer including an input option; receiving an instruction through the input option; generating a prompt for the machine learning model by combining the user selection and the instruction; and providing the prompt to the machine learning model. The operations may also include generating a response to the prompt and displaying the response in the graphical user interface.

In some systems, environment 2000 may be configured as a server that include a memory device (e.g., memory 2004); a database connected to network servers (e.g., networks 2016); and a processor (e.g., processor 2006) configurable to perform operations. The operations may include displaying a graphical user interface on a client device; receiving a user selection of an element displayed in the graphical user interface; and displaying a message on the graphical user interface based on the user selection. The operations may also include displaying a composer on the graphical user interface, the composer includes an input option; receiving an instruction through the input option; generating a prompt for the machine learning model by combining the user selection and the instruction; providing the prompt to the machine learning model; and generating a response to the prompt and displaying the response in the graphical user interface.

In some systems, environment 2000 may be configured to provide tools for capturing inputs and generate customized and detailed prompts for machine model interaction. System 2000 may support interactions GUIs (e.g., with a user making use of a GUI or a computer using the GUI when responding to user prompts in a computer using agent system) and also interactions via other interfaces within digital environments (like APIs communicating client computer systems with a computer model in a computer using agent model). For example, environment 2000 may be configured to provide a composer via an interface. And a processor (e.g., processor 2006) may be configurable to determine whether a user interacts with the composer and, in response to determining a user does not interact with the composer after an interval, removing the composer from the graphical user interface. Further, the system and methods may include generating prompts by merging the user selection with the instruction in a prompt to the LM. And the system and methods disclosed may include generation of responses with alternative responses including, for example, a control response and a treatment response. In some embodiments, disclosed systems and methods may include operations of receiving an additional prompt from a user through the graphical user interface; generating a follow-up answer based on the response and the additional prompt; and displaying the follow-up answer on the graphical user interface. In some embodiments, after receiving the additional prompt, displaying in the graphical user interface a message box including the user selection.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to AI. AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Disclosed embodiments may permit simple and user-tailored development of AI agents that can be used multiple times a day, for multiple tasks, and for multiple purposes, with little technical requirements and simulating a live agent or assistant. The disclosed embodiments may solve technical problems such and provide new technical functionality by facilitating completion of tasks faster, identify useful information faster, create a usage feedback that makes LMs models more accurate and smarter. Further, the disclosed systems and methods may facilitate fine-tuning models at scale.

What is claimed is:

1. A system for targeted interactions with a computer model, the system comprising:
at least one memory storing instructions;
at least one processor configured to execute the instructions to perform operations comprising:
receiving a first prompt through an interface;
storing the first prompt in a session memory, the session memory being temporary storage associated with a session;
outputting a first response to the first prompt using the computer model;
receiving a second prompt through the interface, the second prompt comprising a reference to a segment of the first response and an instruction;
in response to receiving the second prompt, generating a combined prompt by:
retrieving the segment from the session memory and generating a context sub-prompt comprising the segment;
generating an instruction sub-prompt comprising the instruction; and
combining the context sub-prompt with the instruction sub-prompt in the combined prompt; and
outputting a second response to the combined prompt using the computer model and responding to the second prompt, wherein the second response comprises at least one of alternative responses or a feedback request, the alternative responses comprising at least two options resolving the combined prompt, the feedback request including a question; and the session memory is configured to operate in isolation for the session and erase once the session ends.

2. The system of claim 1, wherein:
the reference to the segment specifies at least one of a word, a paragraph, a sentence, or a phrase in the first response;
the instruction specifies a modification to the segment; and
the context sub-prompt comprises a quote to at least a portion of the segment, the quote being marked with an opening symbol and a closing symbols.

3. The system of claim 1, wherein:
the computer model is a language model;
the interface comprises an application programming interface; and
outputting the second response comprises:
tokenizing the combined prompt; and
generating the second response using the language model based on the tokenized combined prompt.

4. The system of claim 1, the operations further comprise:
storing the second response in the session memory;
receiving a third prompt through the interface, the third prompt comprising a second reference and a second instruction, the second reference referring to the second response; and
in response to receiving the third prompt, generating a second combined prompt comprising a second context sub-prompt and a second instruction sub-prompt, the second context sub-prompt comprising a segment of the second response and a segment of the first response, the second instruction sub-prompt comprising the second instruction.

5. The system of claim 1, wherein generating the combined prompt comprises:
retrieving system instructions from a permanent memory associated with the session;
generating a system sub-prompt based on the system instructions; and
combining the context sub-prompt, the instruction sub-prompt, and the system sub- prompt in the combined prompt.

6. The system of claim 1, wherein:
the first prompt comprises instructions to generate at least one of an image or a video;
outputting the first response comprises generating a query for an application programming interface associated with at least one of an image or video generation service;
the first response comprises at least one of an image or a video;
the reference to the segment specifies at least one of an image segment or a video segment; and
generating the combined prompt comprises:
generating a natural language description of the segment using the computer model; and
including the natural language description in the context sub-prompt.

7. The system of claim 1, wherein:
the interface comprises a graphical interface;
outputting the first response comprises displaying the first response in the graphical user interface;
receiving the second prompt comprises:
receiving a selection of an element in the first response displayed in the graphical interface;
displaying a message on the graphical interface based on the selection;
displaying a composer on the graphical user interface, the composer comprising an input option; and
receiving the second prompt through the input option.

8. The system of claim 7, wherein:
the selection comprises emphasizing with a cursor, a portion of the graphical user interface;
the operations comprise:
determining interaction with the composer; and
in response to determining no interaction with the composer after an interval, closing the composer.

9. The system of claim 7, wherein the operations further comprise:
after receiving the second prompt, displaying a message box in the graphical interface comprising the selection and the second response.

10. The system of claim 1, wherein the operations further comprise:
receiving a third prompt through the interface, the third prompt comprising a second reference and a continuation instruction, the second reference referring to the second response; and
in response to receiving the third prompt, generating a second combined prompt comprising a second context sub-prompt and a second instruction sub-prompt.

11. The system of claim 10, wherein:
the second context sub-prompt comprises a segment of the second response and a segment of the first response, and
the second instruction sub-prompt comprises the continuation instruction.

12. The system of claim 1, wherein:
the reference to the segment specifies a phrase in the first response; and
the instruction specifies a modification to the first response.

13. The system of claim 12, wherein:
the context sub-prompt comprises a quote of the segment, the quote of the segment being marked with an opening delimiter and a closing delimiter in the context sub-prompt.

14. The system of claim 1, wherein:
the first response comprises at least one of an image or a video; and
generating the context sub-prompt comprises generating a natural language description of the segment in the at least one of the image or the video.

15. The system of claim 1, wherein:
the combined prompt comprises a system sub-prompt retrieved from a permanent memory.

16. The system of claim 15, wherein:
the permanent memory is configured to store system instructions; and
the system instructions comprise directives to generate responses regardless of conversations in specific sessions, the system instructions comprising directives for at least one of tone, format, or style.

17. The system of claim 1, wherein:
the second response comprises a feedback request; and
the operations further comprise outputting the feedback request.

18. The system of claim 1, wherein the operations further comprise:
storing the second response in a client memory, the client memory being configured to be accessible across different sessions associated with a user.

19. The system of claim 1, wherein:
the computer model comprises at least two computer models; and
outputting the second response comprises:
providing the combined prompt to the at least two models, each of the at least two models being configured to generate the respective alternative responses;
and
outputting the alternative responses for user selection.

* * * * *